(12) United States Patent
Koike et al.

(10) Patent No.: US 7,568,392 B1
(45) Date of Patent: Aug. 4, 2009

(54) MEASURING APPARATUS FOR A MOWER

(75) Inventors: Kazuo Koike, Sakai (JP); Masatoshi Yamaguchi, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/051,828

(22) Filed: Mar. 19, 2008

(51) Int. Cl.
*G01L 7/00* (2006.01)
(52) U.S. Cl. .......................... 73/714; 56/203
(58) Field of Classification Search ............... 73/756, 73/714; 56/203
See application file for complete search history.

(56) References Cited

U.S. PATENT DOCUMENTS

| | | | | |
|---|---|---|---|---|
| 3,924,389 A | * | 12/1975 | Kita | 56/10.2 A |
| 5,309,699 A | * | 5/1994 | Ehn, Jr. | 56/10.2 E |
| 5,929,339 A | * | 7/1999 | Moore et al. | 73/756 |
| 6,065,347 A | * | 5/2000 | Moore et al. | 73/756 |
| 6,622,465 B2 | * | 9/2003 | Jerome et al. | 56/203 |
| 2003/0010005 A1 | * | 1/2003 | Jerome et al. | 56/12.8 |
| 2006/0277886 A1 | * | 12/2006 | Benway | 56/203 |

FOREIGN PATENT DOCUMENTS

JP 06307763 1/1994

* cited by examiner

*Primary Examiner*—Andre J Allen
(74) *Attorney, Agent, or Firm*—The Webb Law Firm

(57) ABSTRACT

A measuring apparatus for a mower includes a floor defining a downward recess with respect to a floor surface, and an air speed measuring device or air pressure measuring device disposed in the recess for measuring a speed or pressure of air blown by the mower. The measuring device has air speed detecting elements or air pressure detecting elements. The air speed detecting elements or air pressure detecting elements have detecting heights including a height level with the floor surface.

12 Claims, 18 Drawing Sheets

MEASURING APPARATUS FOR A MOWER

BACKGROUND OF THE INVENTION

This invention relates to a measuring apparatus for a mower.

As a conventional technique, as disclosed in JP6-307763, for example, a wind measurement apparatus is known which has a pressure detecting device for measuring a pressure of gas passage in a duct.

Conventionally, a measurer brings a portable type air speedometer or air pressure gauge close to a lower part of a mower unit of a mowing machine, and measures a speed or pressure of air blown by the mower unit. When the air speedometer or air pressure gauge is brought close to the lower part of the mower unit of the mowing machine, the measurer's hand, air speedometer or air pressure gauge will interrupt the flow of air blown by the mower unit. This causes variations in the flow of air blowing to areas around the mower unit. As a result, it is difficult to measure the speed or pressure of air blown by the mower unit in a state of actually cutting lawn or grass. It is still more difficult to measure accurately to measure the speed or pressure of air blown by the mower unit.

When the measurer brings a portable type air speedometer or air pressure gauge close to the lower part of the mower unit of the mowing machine to measure an air speed or pressure, the measurer's hand tends to be unsteady. It is difficult to measure the speedometer or air pressure by moving the air speedometer or air pressure gauge close to a position for measure the speed or pressure and keeping the air speedometer or air pressure gauge close to that position. As a result, the position for measuring air speed or air pressure is not stabilized, and it is difficult to measure in an accurate position the speed or pressure of air blown by the mower unit.

SUMMARY OF THE INVENTION

The object of this invention is to realize an apparatus for accurately measuring in an accurate position the speed or pressure of air blowing out of a mower in a state close to actually cutting lawn or grass.

In one embodiment of the invention, a measuring apparatus for a mower comprises:

a floor defining a downward recess with respect to a floor surface; and an air speed measuring device disposed in said recess for measuring a speed of air blown by the mower, said air speed measuring device having one or more air speed detecting elements, and said air speed detecting elements having detecting heights including a height level with said floor surface.

In another embodiment of the invention, a measuring apparatus for a mower comprises:

a floor defining a downward recess with respect to a floor surface; and an air pressure measuring device disposed in said recess for measuring a pressure of air blown by the mower, said air pressure measuring device having one or more air pressure detecting elements, and said air pressure detecting elements having detecting heights including a height level with said floor surface.

In a further embodiment of the invention, a measuring apparatus for a mower comprises:

an air speed measuring device disposed in a recess formed in a floor surface for measuring a speed of air blown by the mower, said air speed measuring device having one or more air speed detecting elements, said air speed detecting elements having detecting heights including a height level with said floor surface; and an air pressure measuring device disposed in the recess formed in the floor surface for measuring a pressure of air blown by the mower, said air pressure measuring device having one or more air pressure detecting elements, said air pressure detecting elements having detecting heights including a height level with said floor surface;

wherein said air speed measuring device and said air pressure measuring device are supported together by a frame structure.

DETAILED DESCRIPTION OF PREFERRED EMBODIMENTS

Overall Construction of Measuring System

Figure 1:
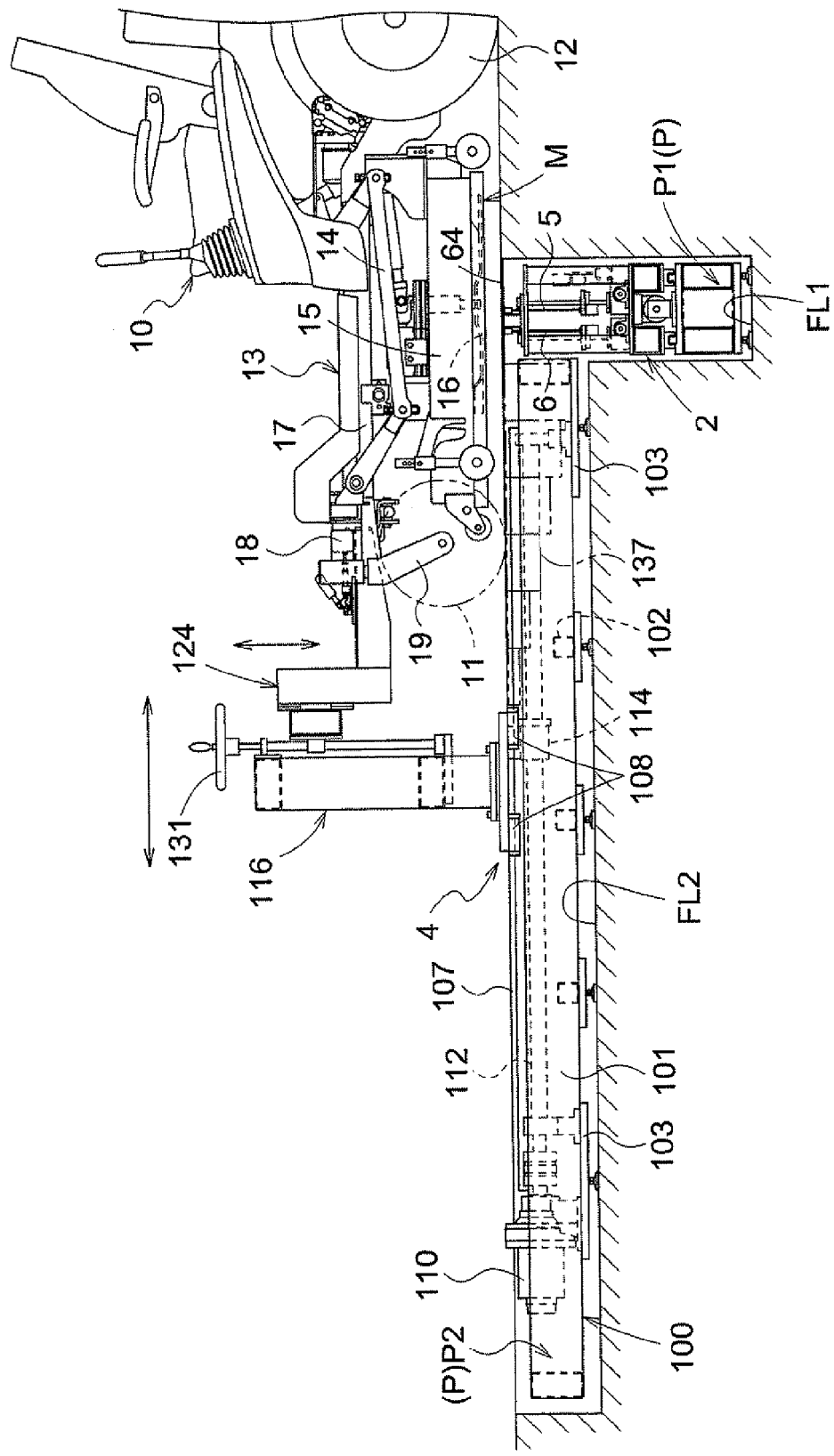
FIG. 1 is a left-hand side view of an entire measuring system.
Figure 2:
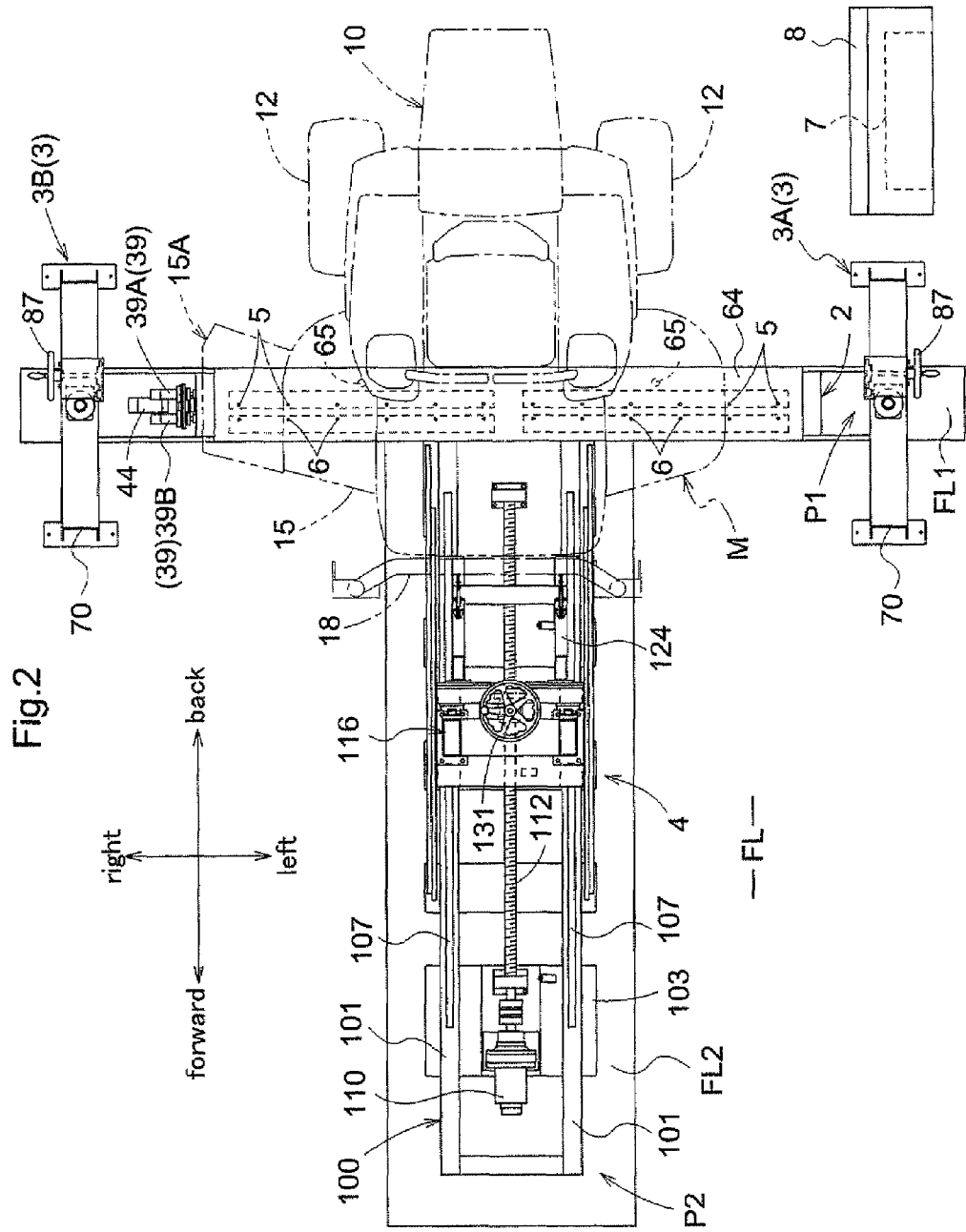
FIG. 2 is a plan view of the entire measuring system.
Figure 3:
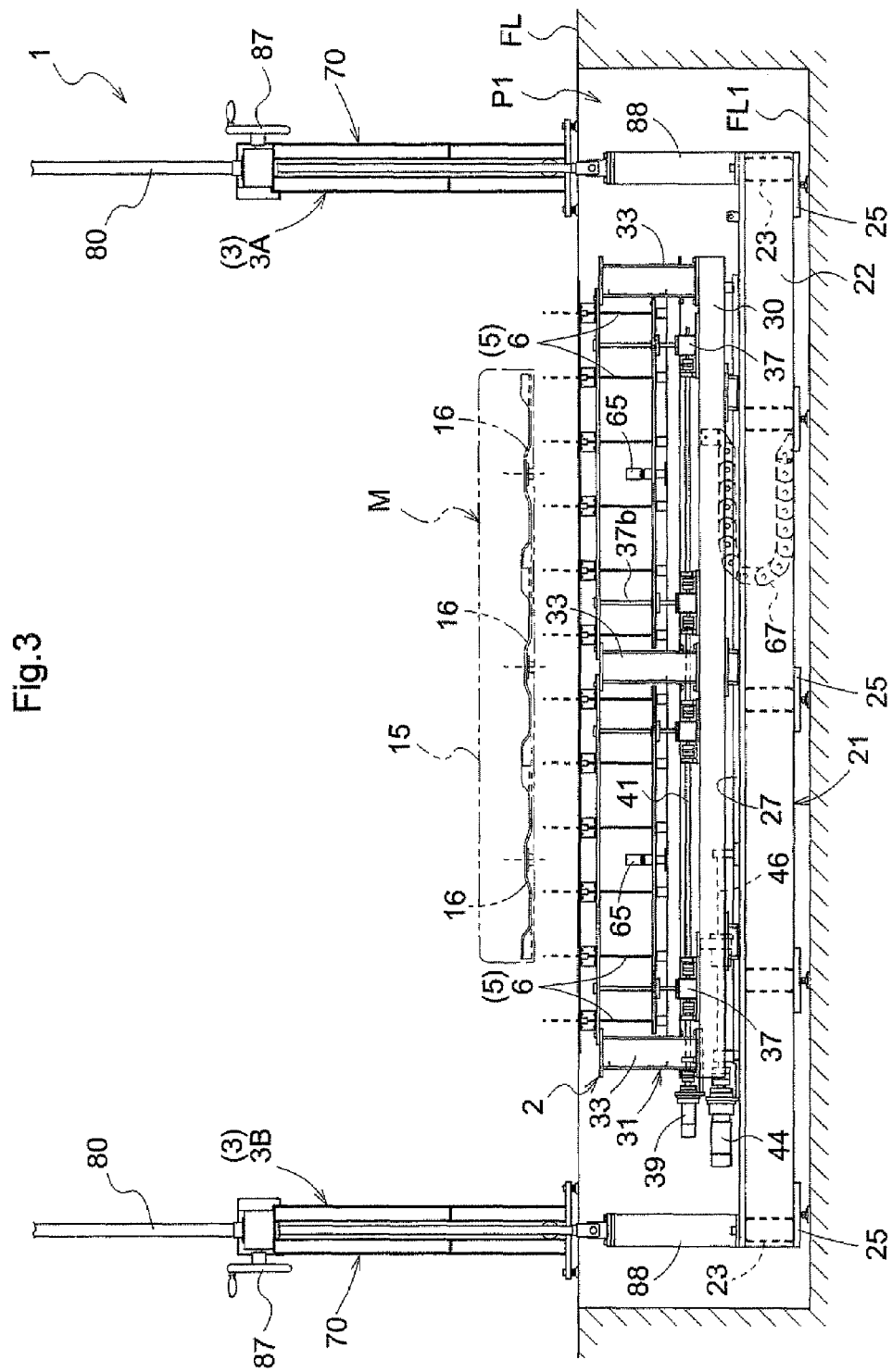
FIG. 3 is a front view of the entire measuring system.

An overall construction of a measuring system 1 will be described with reference to FIGS. 1 through 3. FIGS. 1 through 3 are an overall side view, and overall plan view and an overall front view of the measuring system 1. In the following description, the leftward part and rightward part of FIG. 2 will be indicated the front and rear, respectively, and the lower part and upper part of FIG. 2 will be indicated the left-hand side and right-hand side, respectively.

As shown in FIGS. 1 through 3, the measuring system 1 includes a measuring apparatus 2 for measuring air speed or air pressure of a mower unit M of a riding type lawn mower 10, a lift mechanism 3 for raising and lowering the measuring apparatus 2, a moving mechanism 4 for moving the lawn mower 10 forward and backward when measuring air speed and air pressure with the measuring apparatus 2, and a control panel 8 having a control device 7 mounted therein for controlling the measuring apparatus 2 and moving mechanism 4. In FIGS. 1 through 3, the mower unit M of riding type lawn mower 10 is shown as having moved over the measuring apparatus 2.

A concrete floor FL has a pit P T-shaped in plan view and dented down. The pit P includes a first pit P1 (corresponding to the recess) of rectangular parallelepiped shape elongated in the right and left direction for receiving the measuring apparatus 2 to be described hereinafter, and a second pit P2 of rectangular parallelepiped shape elongated in the fore and aft direction for receiving the moving mechanism 4 to be described hereinafter. The measuring apparatus 2 of rectangular parallelepiped shape elongated in the right and left direction and vertically long in side view is installed in the first pit P1, with fixed spaces from the front, rear, right and left walls of the first pit P1. The right and left sides of the measuring apparatus 2 are linked with the lift mechanism 3 arranged at the right and left sides of the measuring apparatus 2. By operating the lift mechanism 3 up and down, the measuring apparatus 2 can be pulled up from the first pit P1 above the floor FL, and can be placed in the first pit P1 from above the floor FL.

The moving mechanism 4 of rectangular parallelepiped shape elongated in the fore and aft direction and horizontally long in side view is installed in the second pit P2, with fixed spaces from the front, right and left walls of the second pit P2. A slide frame 116 slidable fore and aft is mounted on the upper surface of the moving mechanism 4. By operating the moving mechanism 4 to slide the slide frame 116 fore and aft, the riding type lawn mower 10 connected to the rear end of the slide frame 116 can be moved forward and backward. The moving mechanism 4 moving the lawn mower 10 forward and backward can change a fore and aft position of the mower unit M of the lawn mower 10 relative to the measuring apparatus 2.

Thus, the invention employs a construction for installing the measuring apparatus 2 in the first pit P1 formed in the floor FL. Compared, for example, with a case where the first pit P1 is not formed, and a mount (not shown) formed of a framework above the floor FL, and the measuring apparatus 2 vertically long in side view is installed on the mount, the described construction does not require the mount to be fabricated according to the size, model and so on of the lawn mower 10. Even when the lawn mower 10 is different in size or model, air speed or air pressure can be measured with one measuring apparatus 2.

Compared with the case of installing the mount formed of a framework above the floor FL, the measuring apparatus 2 can be installed compactly in a narrow installation space, and the measuring system 1 can hardly be obstructive when unused. Further, compared with the case of installing the mount formed of a framework above the floor FL, the riding type lawn mower 10 can be moved steadily over the floor FL with relatively less irregularity. This improves the working efficiency of measuring air speed or air pressure.

The riding type lawn mower 10 connected to the moving mechanism 4 has the mower unit M suspended through a linkage mechanism 14 from a vehicle body 13 between a pair of right and left front wheels 11 and a pair of right and left rear drive wheels 12. The mower unit M may be raised and lowered in a posture substantially parallel to the ground (floor FL) while adjusting a cutting height according to the length of lawn or grass by adjusting a cutting height control instrument (not shown) provided on a driver's seat to operate the linkage mechanism 14.

The mower unit M has a triple blade structure including three blades 16 driven by vertical shafts and juxtaposed transversely of a mower deck 15 having a channel-shaped section opening downward in side view. The blades 16 are rotatable to cut lawn or grass, and resulting grass clippings can be discharged from a discharge opening 15A formed in the right-hand side of the mower deck 15.

The body frame 17 has, at the front thereof, a front frame 18 in the form of a square pipe elongated right and left. Front wheel brackets 19 are supported at the right and left ends of the front frame 18 to be swingable about vertical axes. The pair of right and left front wheels 11 are rotatably supported by the front wheel brackets 19 through connecting bolts (not shown). When air speed and air pressure are measured with the measuring apparatus 2, the front frame 18 is placed on and fixed to the upper surface of a connecting frame 124 of the moving mechanism 4, the front wheels 11 are removed from the front wheel brackets 19, and the riding type lawn mower 10 is set to the state shown in FIG. 1. In FIG. 1, the front wheels 11 are in the removed state.

By operating a lift wheel 131 of the moving mechanism 4, the front wheels 11 of the lawn mower 10 may be removed, and the upper surface of the mower deck 15 held in a horizontal position parallel to the floor FL. This provides a position of the lawn mower 10 in a state of actually cutting lawn or grass with the lawn mower 10.

[Detailed Construction of Measuring Apparatus]

Figure 4:
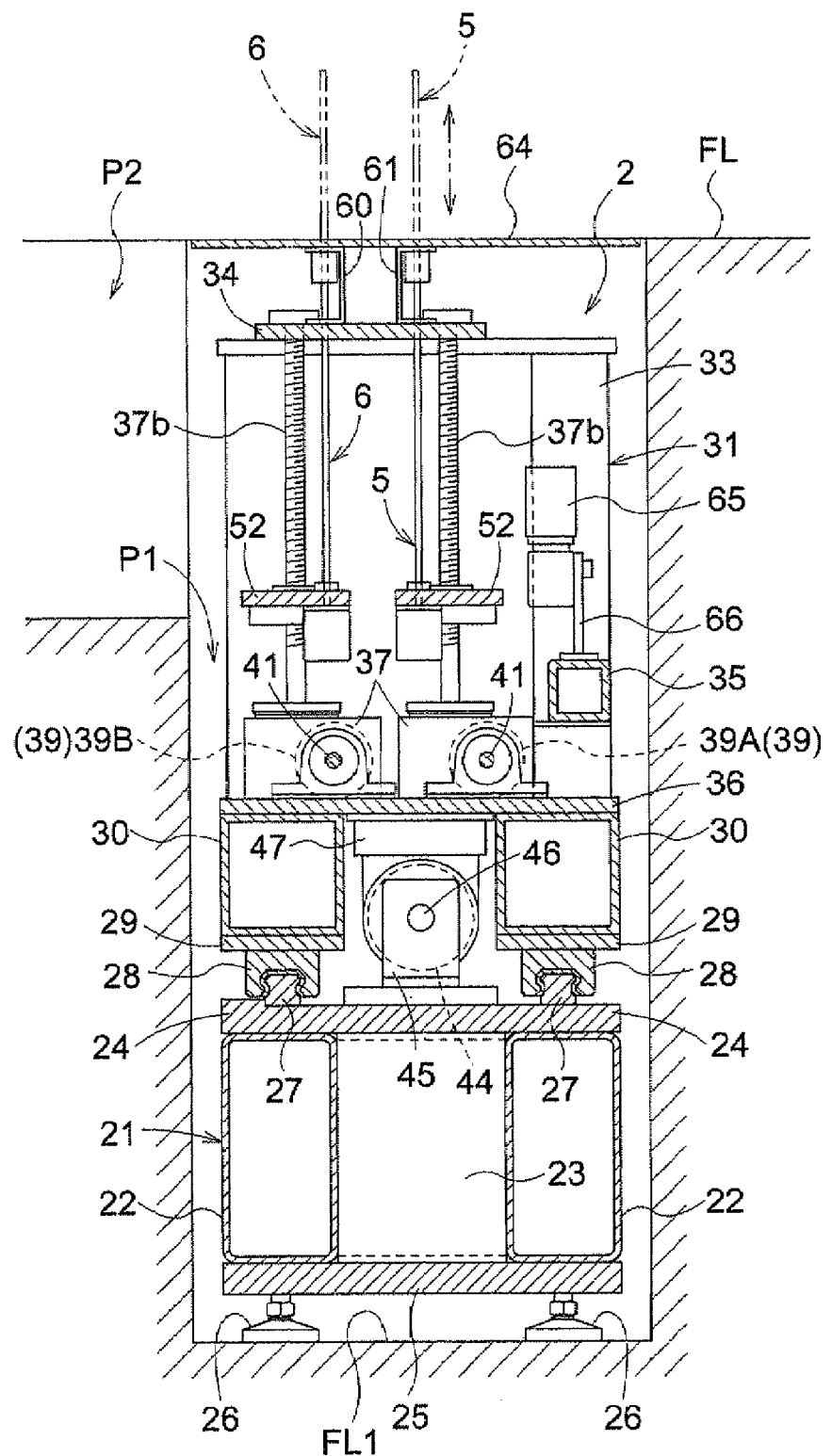
FIG. 4 is a view in vertical section showing a construction of a measuring apparatus.
Figure 5:
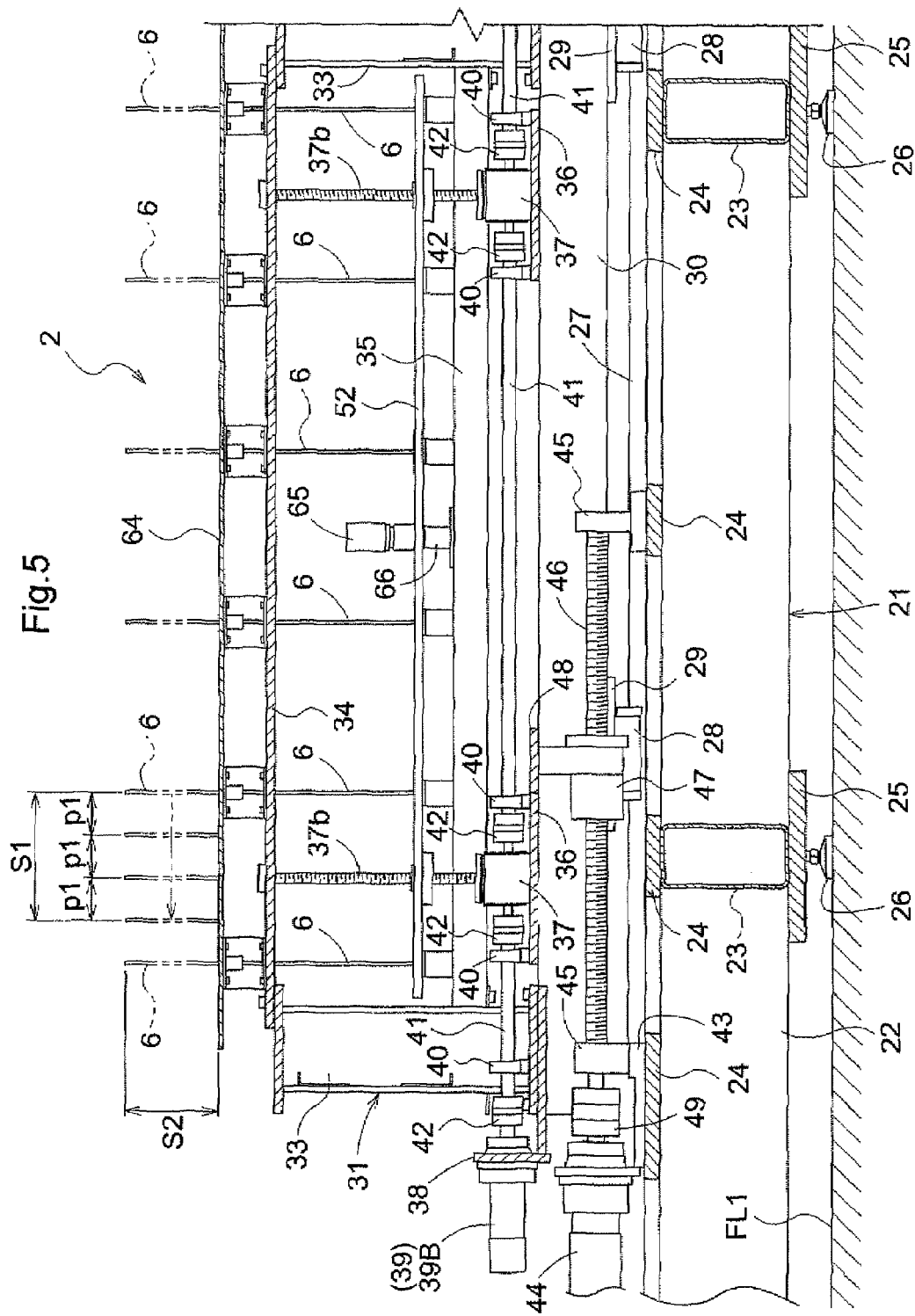
FIG. 5 is a front view in vertical section showing a construction on the right-hand side of the measuring apparatus.
Figure 6:
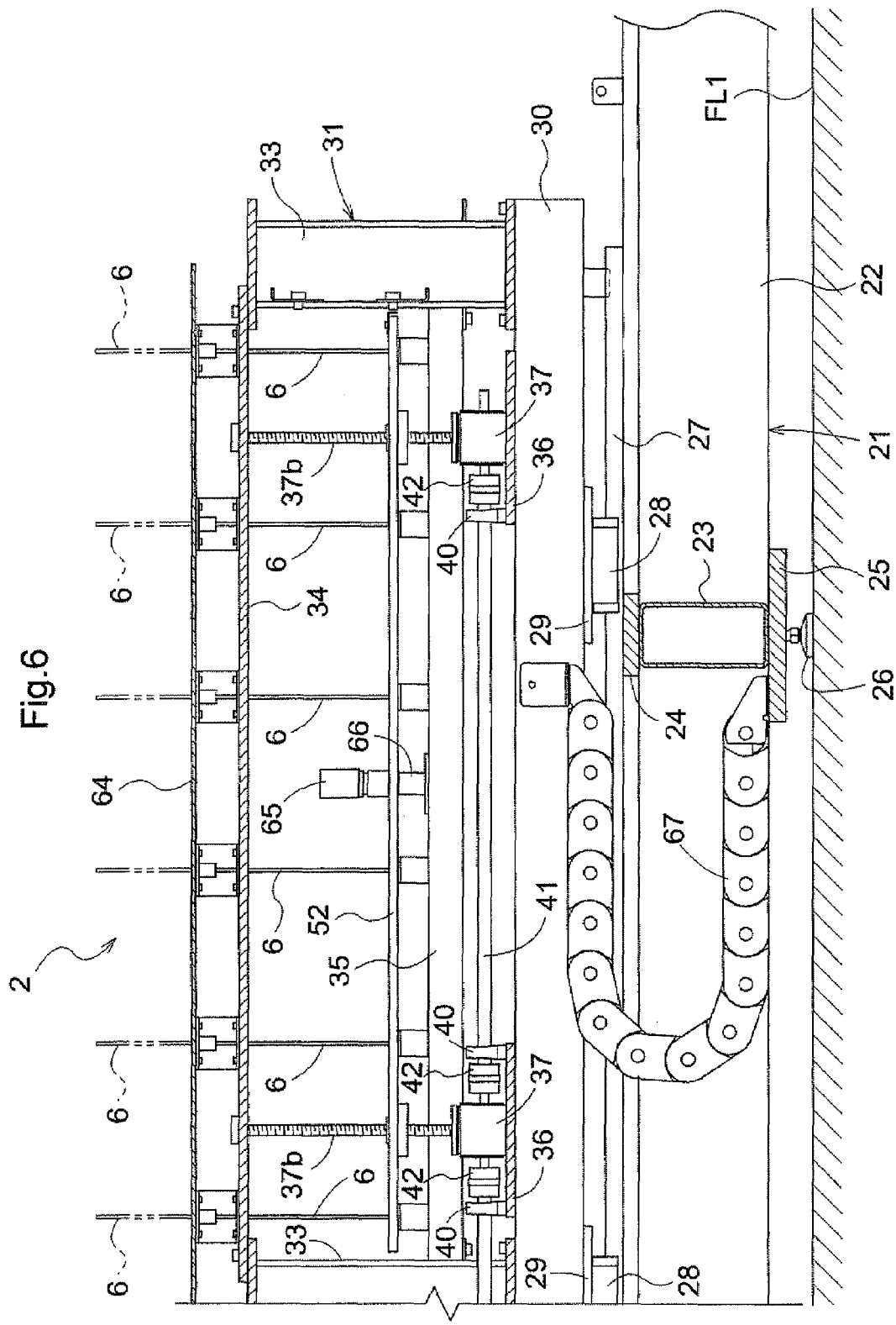
FIG. 6 is a front view in vertical section showing a construction on the left-hand side of the measuring apparatus.

A detailed construction of the measuring apparatus 2 will be described with reference to FIGS. 4 through 6. FIGS. 4 through 6 are an overall view in vertical section of the measuring apparatus 2, a front view in vertical section of the right-hand side of the measuring apparatus 2, and a front view in vertical section of the left-hand side of the measuring apparatus 2.

As shown in FIGS. 4 through 6, the measuring apparatus 2 includes a base frame 21, a slide frame 31, vertical feed motors 39, a horizontal feed motor 44, air speed sensors 5 (corresponding to the air speed measuring device), and air pressure sensors 6 (corresponding to the air pressure measuring device).

The base frame 21 includes front and rear main frames 22 in the form of square pipes elongated right and left, a plurality of subframes 23 fixed to the front and rear main frames 22, upper plates 24 fixed to upper surfaces of the main frames 22 and subframes 23, and a plurality of lower plates 25 fixed to lower surfaces of the main frames 22 and subframes 23. These components are firmly connected by welding.

The lower plates 25 have a plurality of vertical threaded holes formed therein, and a plurality of jack bolts 26 are vertically adjustably attached to the threaded holes from below. By adjusting the jack bolts 26, levelness in the fore and aft direction and right and left direction of the measuring apparatus 2 may be varied or adjusted when the measuring apparatus 2 is placed on a first pit floor FL1 of the first pit P1. Thus, the measuring apparatus 2 may be adjusted level in the fore and aft direction and right and left direction relative to the floor FL.

The upper plates 24 have front and rear slide rails 27 fixed to the upper surface thereof and elongated right and left. A plurality of slide blocks 28 are fitted on the front and rear slide rails 27 to be slidable right and left. The slide frame 31 is fixed to the upper surfaces of the front and rear slide blocks 28 through plates 29 and aluminum blocks 30 in the form of square cylinders. When the horizontal feed motor 44 described hereinafter is rotated, the slide frame 31 can slide right and left smoothly.

The slide frame 31 includes front, middle and rear vertical frames 33 extending upward from right and left ends and a middle position of the upper surfaces of the aluminum blocks 30, upper cross frames 34 extending from the upper surface of the middle vertical frame 33 to the upper surfaces of the right and left vertical frames 33, respectively, and aluminum blocks 35 in the form of square cylinders extending from a rear position of the middle vertical frame 33 to rear positions of the right and left vertical frames 33, respectively.

A plurality of plates 36 are fixed to the upper surfaces of the aluminum blocks 30, and transmission cases 37 are mounted on the upper surfaces of these plates 36, respectively. A bracket 38 extends rightward from the vertical frame 33 located at the right-hand ends of the aluminum blocks 30. A vertical feed motor 39 with an output shaft extending leftward is fixed in a sideways posture to the bracket 38. A plurality of bearing members 40 are fixed to the plates 36 and the lower plates of the vertical frames 33. These bearing members 40 rotatably support a plurality of drive shafts 41 elongated right and left.

Each transmission case 37 houses an input shaft 37a extending right and left through the transmission case 37, a first bevel gear (not shown) fixed to the input shaft 37a, a second bevel gear (not shown) meshed with the first bevel gear, an upwardly extending output shaft 37b to which the second bevel gear is fixed. When the input shaft 37a is rotated, the output shaft 37b rotates as interlocked with rotation of the input shaft 37a (see FIG. 8).

Each input shaft 37a extending right and left from the transmission case 37 is interlocked to the drive shaft 41 through a coupling 42. When the vertical feed motor 39 is rotated, the output shafts 37b of the four transmission cases 37 are driven through the plurality of drive shafts 41 and transmission cases 37 to rotate in the same direction of rotation with the same number of rotations.

A motor bracket 43 is fixed to the upper plate 24 located outward of the right-hand ends of the slide rails 27. The horizontal feed motor 44 with an output shaft extending leftward is fixed in a sideways posture to the motor bracket 43. Right and left bearing members 45 are fixed to middle positions in the fore and aft direction of the upper surfaces of the upper plates 24. A transmission shaft 46 is rotatably supported by these bearing members 45. The transmission shaft 46 has a ball screw formed thereon to extend between opposite end regions thereof. The transmission shaft 46 with the ball screw has a ball screw nut 47 mounted to be rotatable relative to the transmission shaft 46 through a plurality of transmission balls (not shown).

A bracket 48 extends downward from the aluminum blocks 30 of the slide frame 31, and the ball screw nut 47 is fixed to this bracket 48. When the ball screw nut 47 slides right and left, the slide frame 31 moves right and left.

The right-hand end of the transmission shaft 46 is interlocked to the output shaft of the horizontal feed motor 44 through a coupling 49. When horizontal feed motors 44 is rotated forward and backward, the transmission shaft 46 is rotated forward and backward. Thus, the ball screw nut 47 mounted on the transmission shaft 46 is movable right and left with forward and backward rotations of the horizontal feed motor 44.

The above constitutes a measuring apparatus moving mechanism for moving the air speed sensors 5 or air pressure sensors 6 right and left along the floor FL by causing the horizontal feed motor 44 to move the slide frame 31 right and left.

With the measuring apparatus 2 having the described construction, the air speed sensors 5 and air pressure sensors 6 can be moved up and down and right and left smoothly and accurately. This construction can measure correctly in a correct position the speed and pressure of air blown by the mower unit M of riding type lawn mower 10 located above the measuring apparatus 2. The measuring apparatus 2 constructed to be long in the right and left direction is not constrained by the size of mower unit M. Thus, one measuring apparatus 2 can measure efficiently the speed or pressure of the air blowing out of mower units (not shown) of a plurality of different type lawn mowers.

[Detailed Construction of Sensor Mount]

A detailed construction of a mount of the air speed sensors 5 and air pressure sensors 6 will be described with reference to FIGS. 7 and 8.

Figure 7:
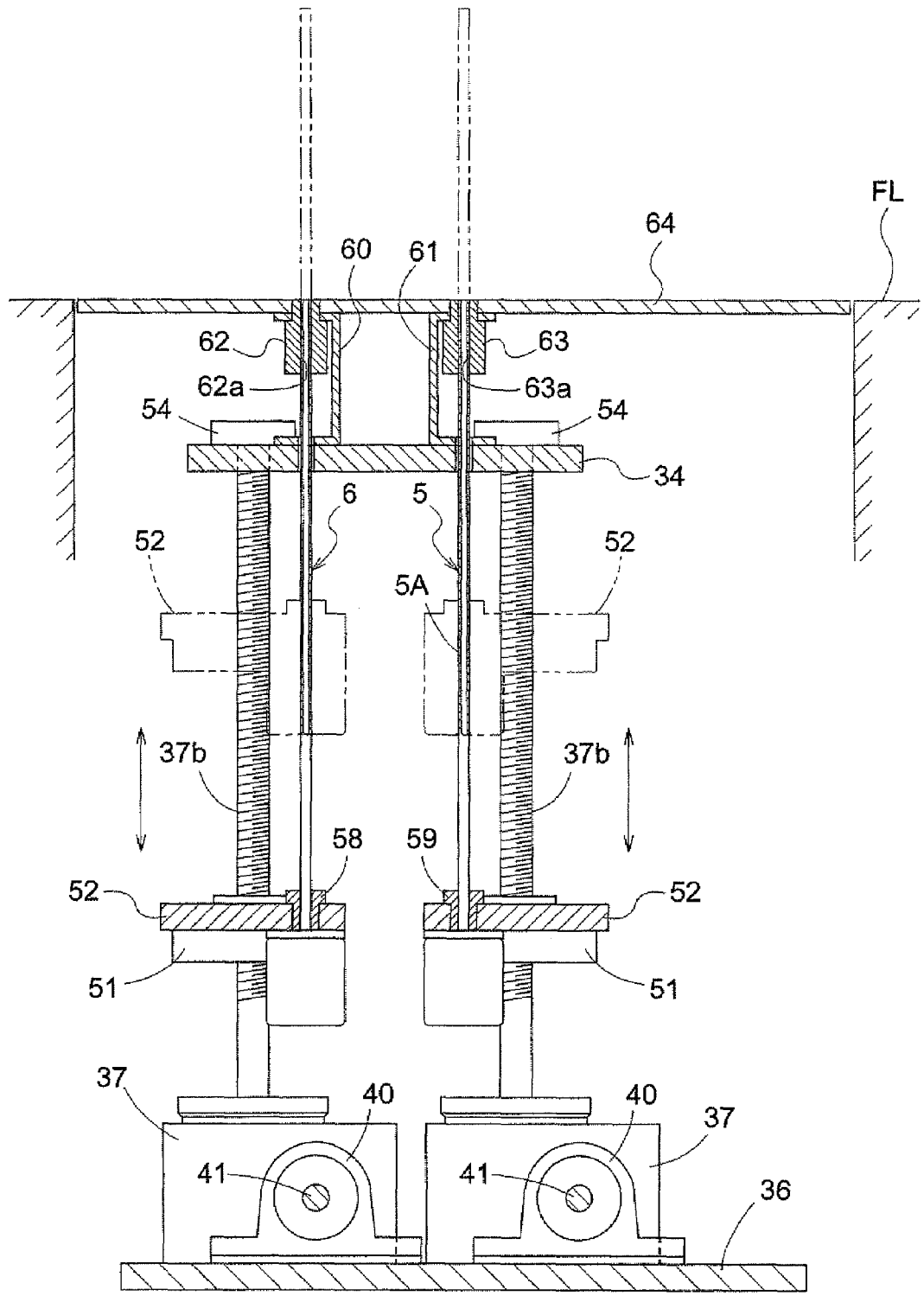
FIG. 7 is a side view in vertical section of an air speed sensor and air pressure sensor mount.
Figure 8:
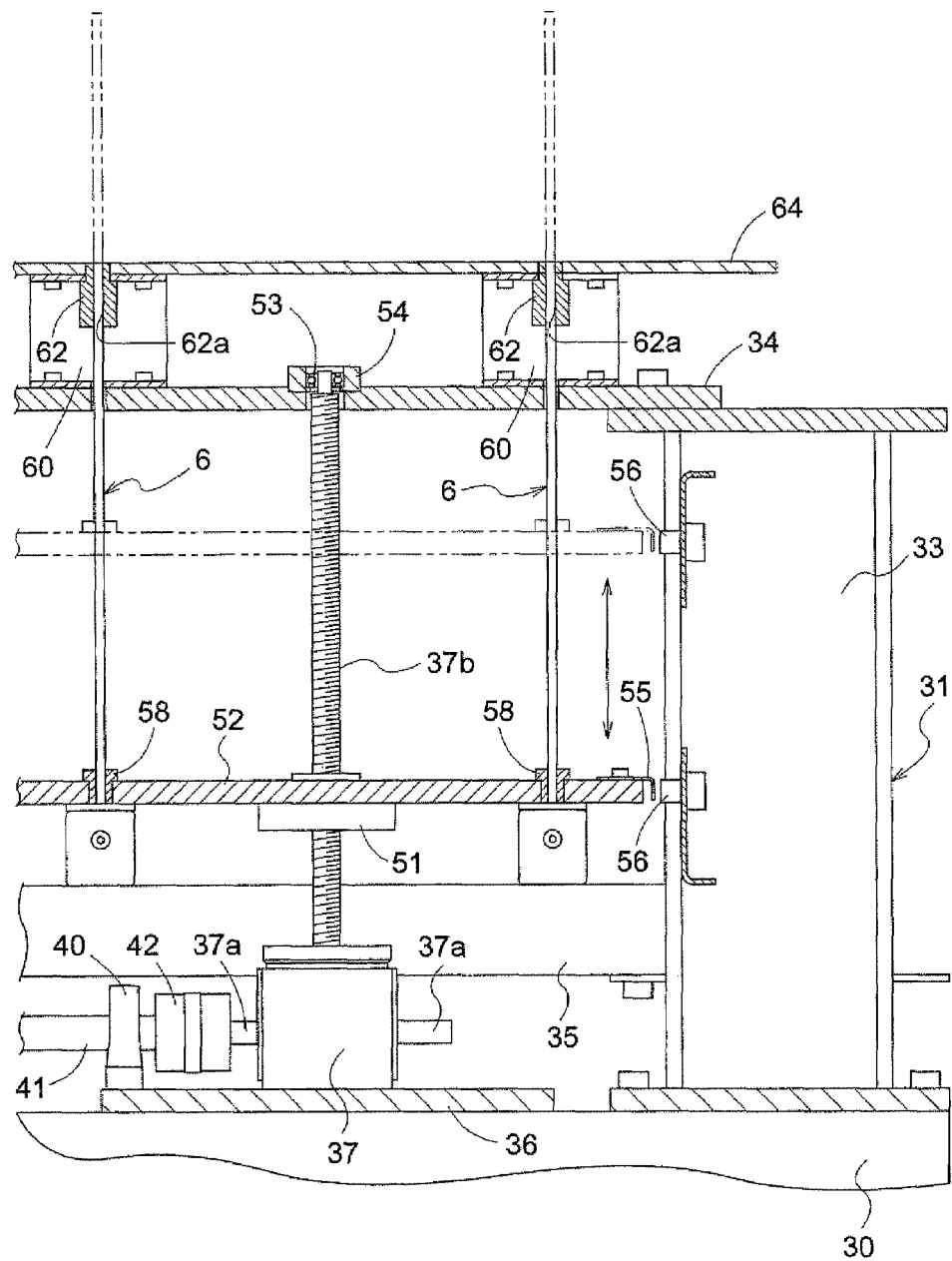
FIG. 8 is a front view in vertical section of the air speed sensor and air pressure sensor mount.

FIGS. 7 and 8 are a side view in vertical section and a front view in vertical section of the sensor mount.

As shown in FIG. 2, the air speed sensors 5 are arranged at equal intervals in the right and left direction in plan view for measuring air speed at predetermined intervals. The air pressure sensors 6 are arranged at predetermined intervals forwardly of the air speed sensors 5, and at equal intervals in the right and left direction in plan view for measuring air pressure at predetermined intervals.

As shown in FIGS. 7 and 8, the output shafts 37b extending is upward from the transmission cases 37 have ball screws formed substantially throughout the lengths thereof. The output shafts 37b with the ball screws formed thereon have nut members 51 attached to be rotatable through transmission balls (not shown).

When the vertical feed motor 39 is rotated to rotate the drive shafts 41, the output shafts 37b are rotated through the transmission cases 37. Then, the nut members 51 attached to the output shafts 37b move up and down.

The plurality of nut members 51 have front and rear moving plates 52 and 52 in the form of band plates elongated in the right and left direction. When the nut members 51 move up and down, the moving plates 52 interlocked to the nut members 51 move up and down while maintaining a horizontal state relative to the floor FL.

The moving plates 52 fixed to the nut members 51 vertically so movable by the vertical feed motor 39 as noted above constitute a measuring device vertical moving mechanism for moving the air speed sensors 5 or air pressure sensors 6 up and down. With the air speed sensors 5 or air pressure sensors 6 movable up and down, air speed or air pressure can be measured at a plurality of heights above the floor FL. The air blown by the mower unit M can be analyzed accurately based on air speed data or air pressure data measured at different heights.

The upper cross frames 34 have disk-shaped downward recesses formed therein, and the upper ends of the output shafts 37b are supported in the recesses by stop plates 54 through bearings 53. Thus, the upper ends of the output shafts 37b are supported by the upper cross frames 34 to be rotatable about vertical axes. With the upper ends of the output shafts 37b rotatably supported by the upper cross frames 34 as noted above, the output shafts 37b do not easily bend, and the nut members 51 attached to the output shafts 37b through the transmission balls can be moved up and down smoothly.

The front and rear moving plates 52 have detection brackets 55 attached to the left-hand ends thereof. Upper and lower positions of the detection brackets 55 are detectable by proximity is sensors 56 attached to upper and lower positions of the left-hand vertical frame 33. Thus, upper end positions and lower end positions of vertical feed strokes S2 of the air speed sensors 5 and air pressure sensors 6 fixed to the moving plates 52 are detected, so that the air speed sensors 5 and air pressure sensors 6 may not move vertically beyond the upper end positions and lower end positions.

The front and rear moving plates 52 have a plurality of sensor mounting bores are formed to extend vertically and arranged at equal intervals in the right and left direction. The vertically elongated air pressure sensors 6 are fixed to the sensor mounting bores of the front moving plate 52 through mounting plugs 58. Vertically elongated sensor pipes 5A are fixed to the sensor mounting bores of the rear moving plate 52 through mounting plugs 59. The air speed sensors 5 are mounted in the sensor pipes 5A.

A plurality of front brackets 60 having a channel-shaped section are fixed, as opening forward, to front parts of the upper surfaces of the upper cross frames 34. A plurality of rear brackets 61 having a channel-shaped section are fixed, as opening rearward, as to rear parts of the upper surfaces of the upper cross frames 34.

The front brackets 60 and rear brackets 61 have openings extending vertically therethrough. Boss members 62 and 63 having sensor mounting bores 62a and 63a extending vertically therethrough are fixed to the upper openings of the front brackets 60 and rear brackets 61. The air pressure sensors 6 are fitted, to be vertically slidable, in the sensor mounting bores 62a of the boss members 62 fixed to the front brackets 60. The sensor pipes 5A containing the air speed sensors 5 are fitted, to be vertically slidable, in the sensor mounting bores 63a of the boss members 63 fixed to the rear brackets 61.

By constructing the air speed sensors 5 and air pressure sensors 6 to be vertically elongated, the air speed sensors 5 and air pressure sensors 6 can be prevented from interrupting flows of air blown by the mower unit M. The air speed and air pressure can be measured in a state close to actually cutting lawn or grass.

A transparent plate 64 is mounted on the upper surfaces of the front brackets 60 and rear brackets 61. The transparent plate 64 can cover a nearly entire upper plane of the first pit P1 where the mower unit M of the riding type lawn mower 10 passes. The transparent plate 64 is not present on the upper plane in right and left end regions of the first pit P1 to allow sliding movement in the right and left direction of the transparent plate 64 (see FIG. 2).

The transparent plate 64 is attached so that the upper surface of the transparent plate 64 may be substantially flush with the floor FL. The transparent plate 64 can prevent the air from the mower unit M from entering the first pit P1, thereby changing the speed and pressure of the air blowing out the mower unit M. This arrangement can produce a state close to actually cutting lawn or grass.

The transparent plate 64 is a thin transparent plate formed of polycarbonate which is not easily damaged or easily deformable by the air blown by the mower unit M. The transparent plate 64 has front and rear through-holes extending vertically and arranged at equal intervals in the right and left direction. The transparent plate 64 is removably mounted on the upper surfaces of the front brackets 60 and rear brackets 61, with the through-holes fitted on the upper ends of the front and rear boss members 62. When the surface of the transparent plate 64 is damaged or stained by movement of the lawn mower 10, for example, the transparent plate 64 can easily be detached from the front brackets 60 and rear brackets 61 to be changed or cleaned. The transparent plate 64 may be formed of a different material, e.g. an acrylic plate.

As shown in FIGS. 5 and 6, right and left photographic cameras 65 are mounted through camera brackets 66 on the upper surfaces of the right-hand aluminum block 35 and left-hand aluminum block 35. These right and left photographic cameras 65 can photograph, through transparent plate 64, the mower unit M moving over the measuring apparatus 2. The photographic cameras 65 are connected to the control device 7, to be described hereinafter, through an image processing device 150. This enables the control device 7 to detect a position of the mower unit M relative to the measuring apparatus 2.

The measuring apparatus 2 includes a cable bearer 67 mounted under an intermediate position between the right and left ends thereof and extending between the base frame 21 and aluminum blocks 30. The cable bearer 67 contains wiring extending from the horizontal feed motor 44, air speed sensors 5, air pressure sensors 6 and photographic cameras 65 to the control device 7. As a result, the wiring to the control device 7 is protected from breakage due to forces caused by rotation of the horizontal feed motor 44 to move the slide frame 31 right and left relative to the base frame 21.

[Detailed Construction of Lift Mechanism]

Figure 9:
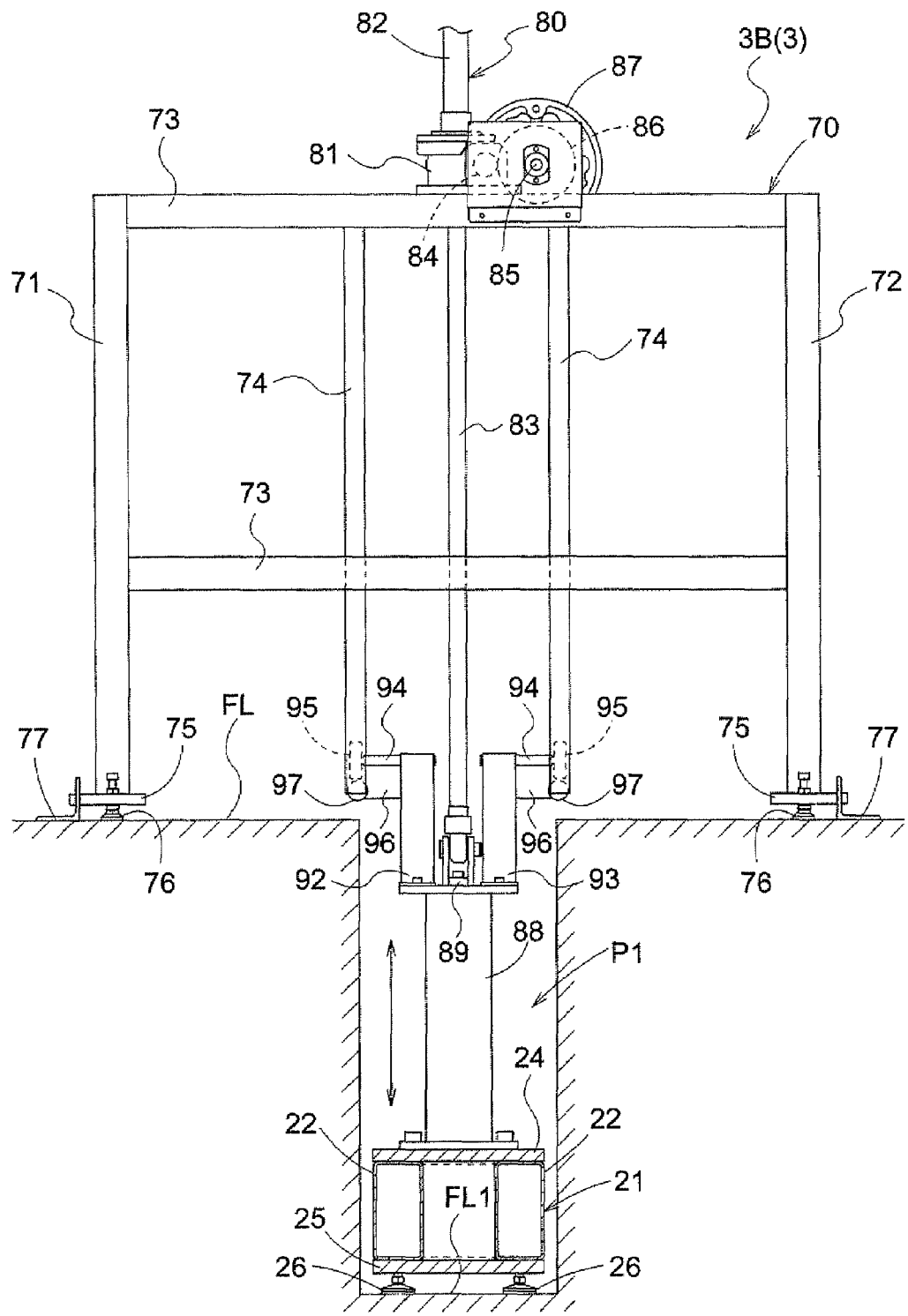
FIG. 9 is a side view showing a construction of a lift mechanism.
Figure 10:
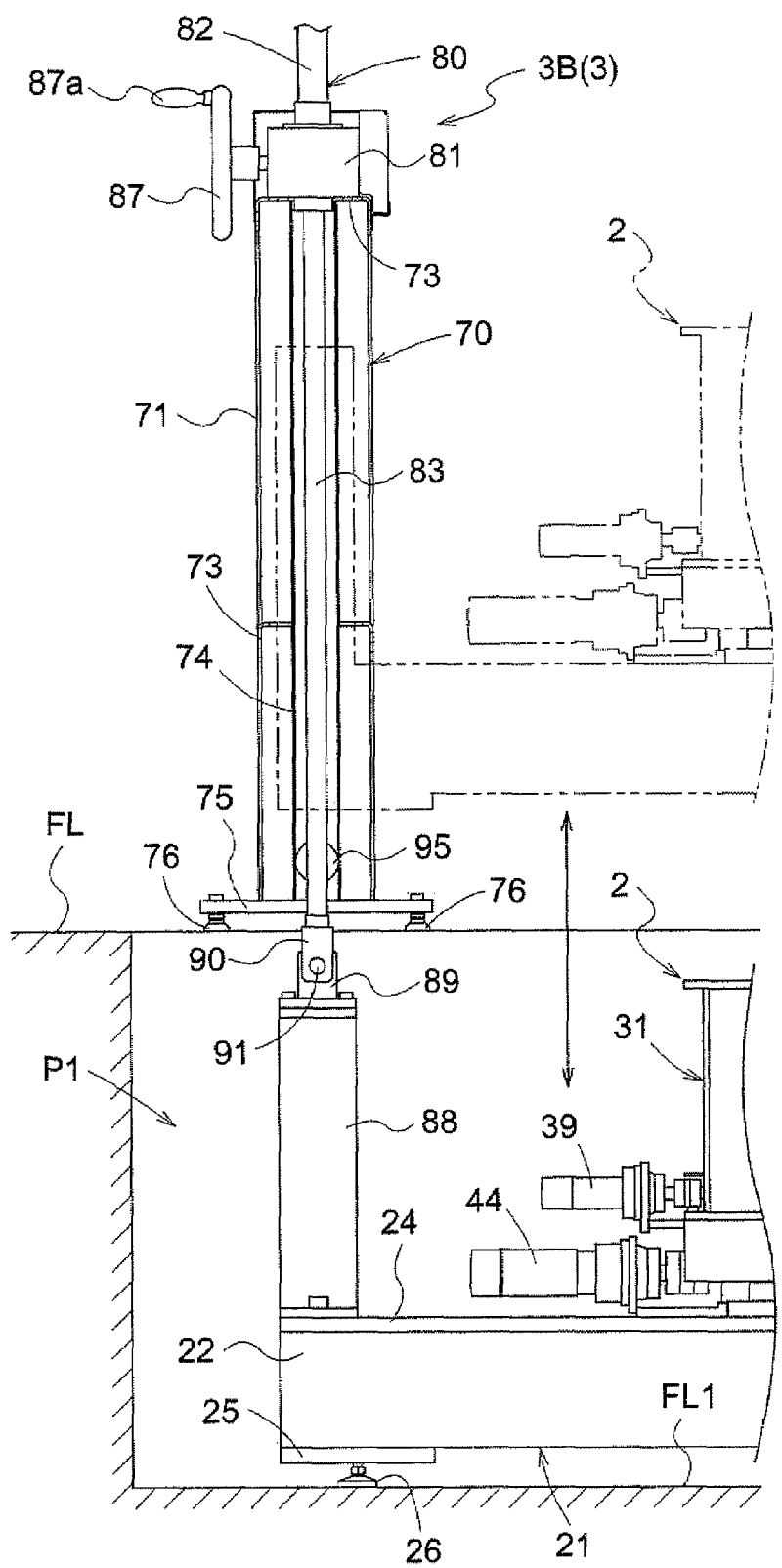
FIG. 10 is a front view in vertical section showing the construction of the lift mechanism.

A detailed construction of the lift mechanism 3 will be described with reference to FIGS. 9 and 10. FIGS. 9 and 10 are a side view of a right-hand side lift mechanism 3B seen from the left-hand side (from the riding type lawn mower 10), and a front view in vertical section of the right-hand side lift mechanism 3B, respectively. While the right-hand side lift mechanism 3B will be described hereinafter, the left-hand side lift mechanism 3A is the same as right-hand side lift mechanism 3B except the difference between right and left.

As shown in FIGS. 2 and 3, the lift mechanism 3 consists of the left-hand side lift mechanism 3A disposed at the left-hand side of the first pit P1, and the right-hand side lift mechanism 3B disposed at the right-hand side of the first pit P1. By operating the left-hand side lift mechanism 3A and right-hand side lift mechanism 3B, the measuring apparatus 2 in the first pit P1 can be raised above the floor FL.

As shown in FIGS. 9 and 10, the right-hand side lift mechanism 3B includes a lift frame 70, a lift cylinder 80 and a connecting frame 88. The lift frame 70 is shaped to straddle the first pit P1 in the fore and aft direction, and has a front vertical frame 71a rear vertical frame 72, fore and aft frames 73, and front and rear guide frames 74. Plates 75 are fixed to the lower ends of the front vertical frame 71 and rear vertical frame 72. Vertical jack bolts 76 are attached to the plates 75 for varying or adjusting an installation height of the lift frame 70.

Retaining brackets 77 are attached to a front part of the plate 75 of the front vertical frame 71 and to a rear part of the plate 75 of the rear vertical frame 72. The lift frame 70 can be fixed to the floor FL by fixing the retaining brackets 77 to the floor FL with anchor bolts (not shown).

The front and rear guide frames 74 extend downward from a middle portion in the fore and aft direction of the upper fore and aft frame 73. The front guide frame 74 has a channel-shaped cross section opening rearward, while the rear guide frame 74 has a channel-shaped cross section opening forward.

The lift cylinder 80 is fixed to the upper surface in the middle position in the fore and aft direction of the upper fore and aft frame 73. The lift cylinder 80 has a case 81, a tube 82 and a rod 83. A vertically elongated tube 82 is fixed to the upper surface of the case 81 fixed to the upper surface of the fore and aft frame 73. A vertically elongated rod 83 is fitted in the tube 82 to extend through and downward from the case 81.

The case 81 houses a drive gear 84, which is rotatable to move the rod 83 up and down relative to the case 81 and tube 82.

A horizontal rotary shaft 85 is rotatably supported by a rear portion of the lift cylinder 80. The rotary shaft 85 has a rotation gear 86 fixed to one end thereof and meshed with the drive gear 84 of the lift cylinder 80. A lift wheel 87 is fixed to the other end of the rotary shaft 85. A grip 87a is rotatably attached to the lift wheel 87. When the operator holds the grip 87a and turns the lift wheel 87, the drive gear 84 of the lift cylinder 80 is rotated through the rotary shaft 85 and rotation gear 86, thereby vertically extending and retracting the rod 83 of the lift cylinder 80.

A locking device (not shown) is attached to the case 81 of the lift cylinder 80. When the locking device is canceled, the lift wheel 87 is permitted to operate the right-hand side lift mechanism 3B. When the locking device is operative, the right-hand side lift mechanism 3B is maintained in a vertical position set by the lift wheel 87.

The right and left connecting frames 88 are fixed to the upper surfaces in right and left end regions of the upper plates 24 of the base frame 21 of the measuring apparatus 2. Connecting brackets 89 are fastened tight to the upper ends of the right and left connecting frames 88 from above. The connecting brackets 89 have front and rear bosses fixed thereto and extending upward. A yoke 90 connected to the forward end of the rod 83 of each lift cylinder 80 is connected between the front and rear bosses by a connecting pin 91 to be rockable about an axis extending in the fore and aft direction.

With the rods 83 connected to the connecting brackets 89 to be rockable about the axis extending in the fore and aft direction as noted above, when the measuring apparatus 2 is slightly inclined to the right or the left while being raised or lowered by operating the lift wheel 87 of the left-hand lift mechanism 3A and the lift wheel 87 of the right-hand lift mechanism 3B, for example, the inclination to the right or left of the measuring apparatus 2 can be absorbed by the connections between the rods 83 and connecting brackets 89. This construction allows the measuring apparatus 2 to be raised and lowered with ease.

A front guide bracket 92 and a rear guide bracket 93 are fixed forwardly and rearwardly of each connecting bracket 89. A shaft 94 extends forward from the upper end of the front guide bracket 92. A bearing 95 is attached to the distal end of the shaft 94 to be rotatable about an axis extending in the fore and aft direction. A shaft 94 extends rearward from the upper end of the rear guide bracket 93. A bearing 95 is attached to the distal end of the shaft 94 to be rotatable about an axis extending in the fore and aft direction.

A bracket 96 extends forward from the front guide bracket 92, and a bearing 97 is attached to the distal end of the bracket 96 to be rotatable about an axis extending in the right and left direction. A bracket 96 extends rearward from the rear guide bracket 93, and a bearing 97 is attached to the distal end of the bracket 96 to be rotatable about an axis extending in the right and left direction.

The bearings 95 and bearings 97 are arranged to contact inner surfaces of the front and rear guide frames 74. The measuring apparatus 2 may be raised and lowered as restricted from moving sideways by the bearings 95 contacting right and left guide surfaces of the guide frames 74. The measuring apparatus 2 may be raised and lowered as restricted from moving fore and aft by the bearings 97 contacting front or rear guide surfaces of the guide frames 74. As a result, the measuring apparatus 2 is prevented from wobbling fore and aft and right and left to be damaged, for example, through contact with wall surfaces of the first pit P1 when the measuring apparatus 2 is vertically moved by the lift mechanism 3.

With the lift mechanism 3 constructed as described above, the measuring apparatus 2 may be moved up and down by operating the lift wheel 87 of the left-hand lift mechanism 3A and the lift wheel 87 of the right-hand lift mechanism 3B. The measuring apparatus 2 may be raised by the lift mechanism 3 from a measuring position in the first pit P1 as shown in FIG. 10 to a maintenance state shown in two-dot chain line in FIG. 10.

By constructing the lift mechanism 3 as described above, the measuring apparatus 2 can be installed in the first pit P1 by the lift mechanism 3, to improve the efficiency of operation to install the measuring apparatus 2. By moving the measuring apparatus 2 to the maintenance position with the lift mechanism 3, the measuring apparatus 2 is maintainable from the floor FL. This improves the working efficiency of maintenance of the measuring apparatus 2.

[Detailed Construction of Moving Mechanism]

Figure 11:
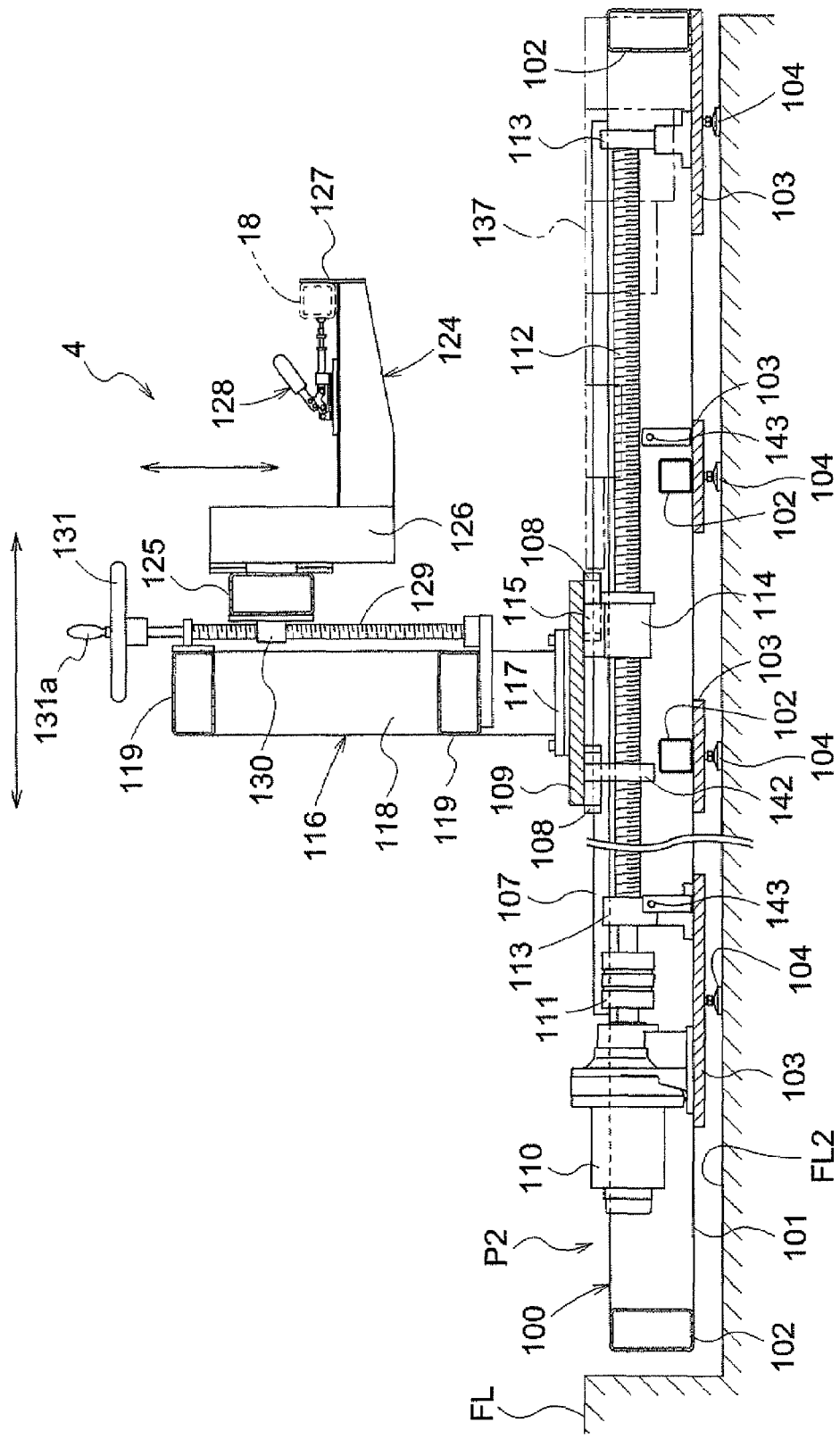
FIG. 11 is a side view in vertical section showing a construction of a moving mechanism.
Figure 12:
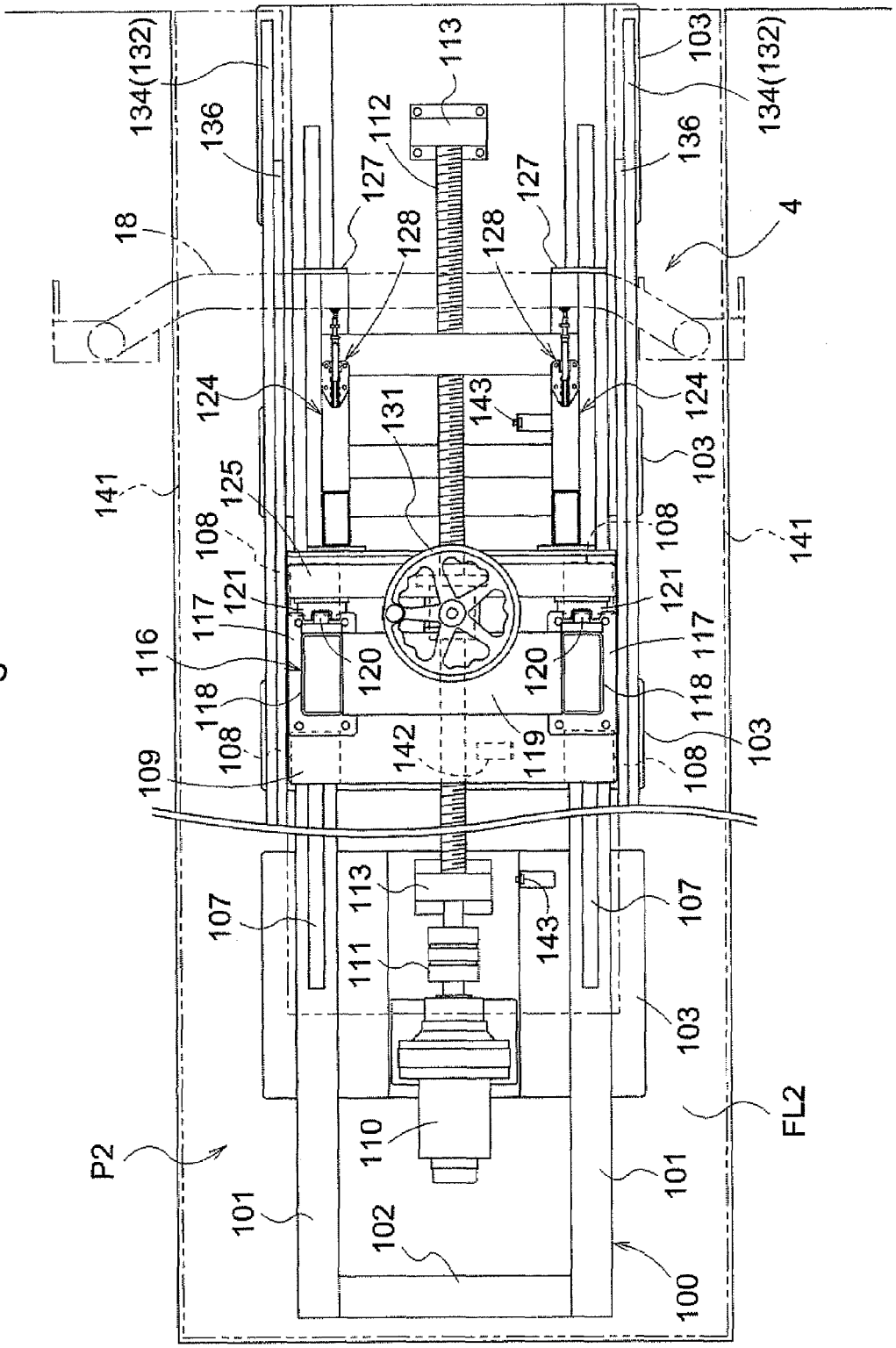
FIG. 12 is a plan view showing the construction of the moving mechanism.
Figure 13:
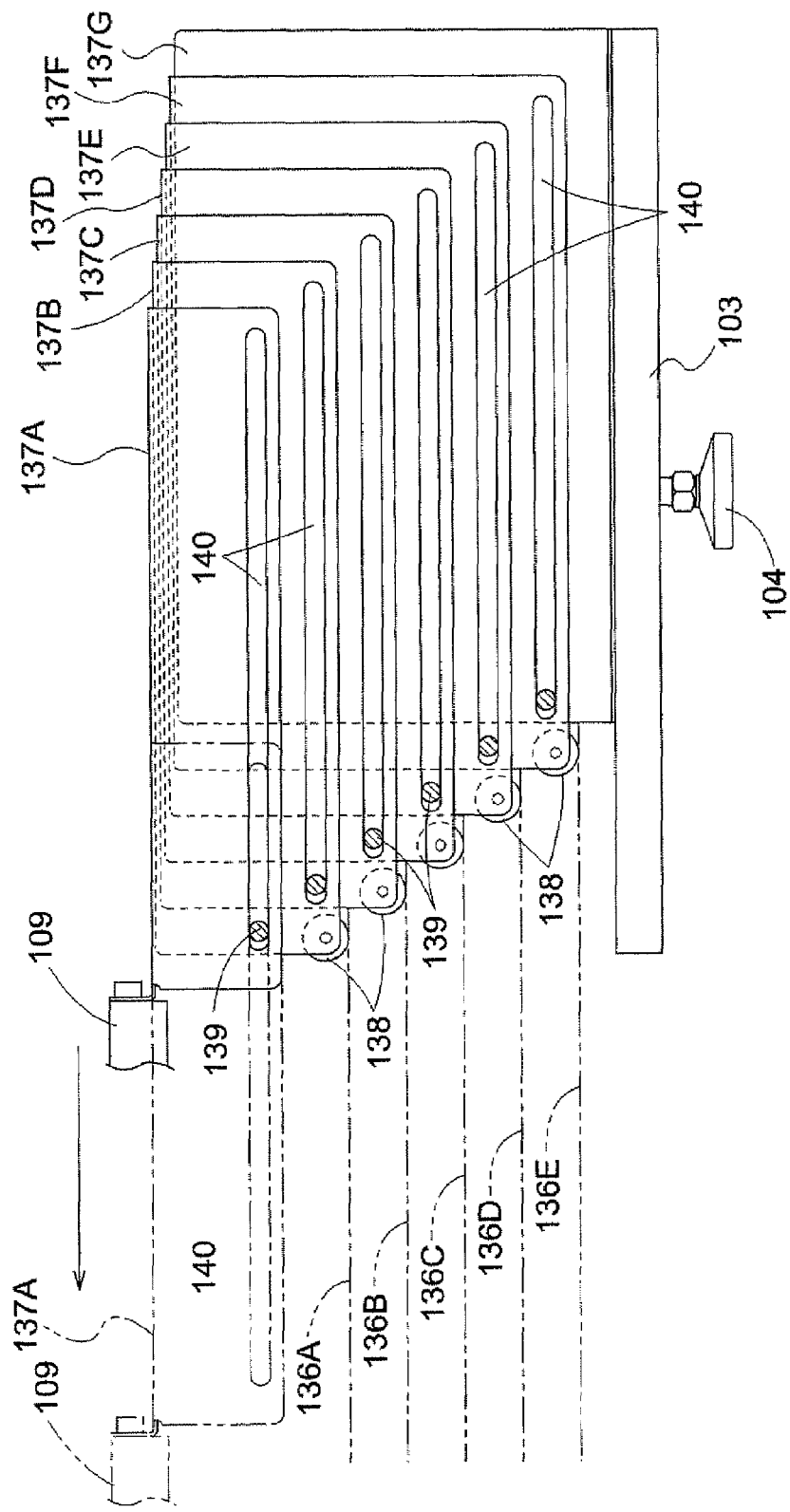
FIG. 13 is a side view showing a construction of a cover mount.
Figure 14:
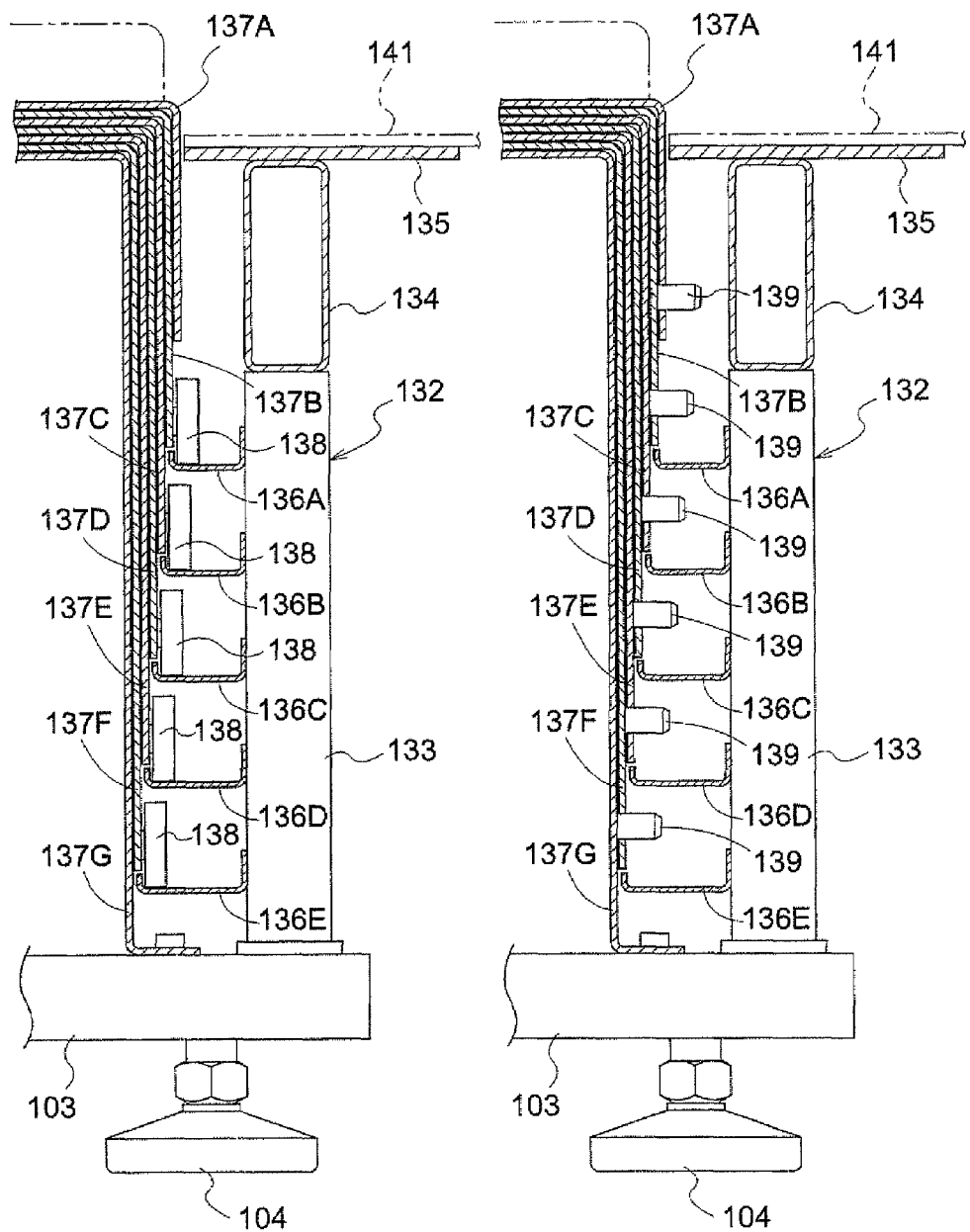
FIGS. 14 (A) and (B) are rear views in vertical section showing the construction of the cover mount.

A detailed construction of the moving mechanism 4 will be described with reference to FIGS. 11 through 14. FIGS. 11 and 12 are a side view in vertical section and a plan view of the moving mechanism 4, respectively. FIGS. 13 and 14 are a side view and rear views in vertical section of a cover mount, respectively. FIGS. 14 (A) and (B) show a rear view in vertical section taken in positions of bearings 138 of FIG. 13, and a rear view in vertical section taken in positions of pins 139 of FIG. 13, respectively.

As shown in FIGS. 11 and 12, the moving mechanism 4 includes a support frame 100, a slide table 109, a fore and aft feed motor 110 and a slide frame 116. The support frame 100 includes is right and left longitudinal frames 101 in the form of square pipes elongated in the fore and aft direction, a plurality of transverse frames 102 in the form of square pipes extending between and fixed to the right and left longitudinal frames 101, and a plurality of lower plates 103 in the form of flat plates fixed to the lower surfaces of the longitudinal frames 101.

Each of the lower plates 103 has a plurality of vertical threaded parts formed in right and left sides thereof, and a plurality of jack bolts 104 are attached to the threaded parts from below for adjusting vertical positions. By adjusting the jack bolts 104, levelness in the fore and aft direction and transverse direction of the moving mechanism 4 may be varied or adjusted when the moving mechanism 4 is placed on the floor FL2 of the second pit P2. Thus, the moving mechanism 4 may be adjusted level in the fore and aft direction and transverse direction relative to the floor FL. The plurality of lower plates 103 have brackets (not shown), elongated in the fore and aft direction and having an L-shaped section, fastened tight to end surfaces at the right and left sides thereof. The moving mechanism 4 can be fixed to the second pit P2 by fixing these brackets to the second pit floor FL2 with anchor bolts (not shown).

Right and left slide rails 107 elongated in the fore and aft direction are fixed to the upper surfaces of the right and left longitudinal frames 101. Each of the right and left slide rails 107 has two front and rear slide blocks 108 mounted thereon to be slidable forward and backward. The slide table 109 is attached to the slide blocks 108 from above. Thus, the slide table 109 is constructed slidable forward and backward.

The fore and aft feed motor 110 is fixed facing the fore and aft direction to the upper surface in the transversely middle portion of the lower plate 103 located at the foremost end of the support frame 100. The fore and aft feed motor 110 has an output shaft interlocked through a coupling 111 to a forward end of a rotary shaft 112 disposed between the right and left longitudinal frames 101.

The rotary shaft 112 has a ball screw formed over an entire length thereof, with a forward end and a rear end supported to be rotatable through bearing members 113 on the upper surfaces of the lower plates 103 located at the foremost end and rearmost end, respectively. The rotary shaft 112 with the ball screw formed thereon has a ball screw nut 114 rotatably mounted thereon through transmission balls (not shown). When the fore and aft feed motor 110 is operated to rotate the rotary shaft 112, the ball screw nut 114 mounted on the rotary shaft 112 moves forward and backward.

The ball screw nut 114 is connected to a lower part of the slide table 109 through a bracket 115. When the ball screw nut 114 moves forward and backward by drive of the fore and aft feed motor 110, the slide table 109 also moves forward and backward together.

The slide frame 116 is fixed to the upper surface of the slide so table 109. The slide frame 116 includes, welded together, right and left connecting plates 117, right and left vertical frames 118 in the form of square pipes extending upward from the right and left connecting plates 117, and transverse frames 119 in the form of square pipes extending between the right and left vertical frame 118. The right and left connecting plates 117 of the slide frame 116 are fastened tight to the upper surface of the slide table 109.

Vertically elongated slide rails 120 are fixed to the rear surfaces of the right and left vertical frames 118. Slide blocks 121 are mounted on the slide rails 120. A connecting frame 124 is fixed to rear surfaces of the slide blocks 121 for connecting the riding type lawn mower 10. The connecting frame 124 includes a transverse frame 125 in the form of a square pipe elongated in the right and left direction, and right and left receiving frames 126 fixed to right and left ends of a rear surface of the transverse frame 125. The receiving frames 126 are formed by welding and shaping square pipe to be L-shaped in side view. Plate-like positioning members 127 are fixed to rear ends of the receiving frames 126.

Clamping devices 128 are mounted on the upper surfaces in middle positions in the fore and aft direction of the receiving frames 126. The lift wheel 131 is operated to move the upper surface of rear end portions of the receiving frames 126 upward into contact with the front frame 18 of the riding type lawn mower 10. Then, the clamping devices 128 are operated to pinch the front frame 18 of the lawn mower 10 between the clamping devices 128 and positioning members 127. In this way, the front part of the lawn mower 10 can be fixed and positioned to the receiving frames 126.

A ball screw 129 extending vertically is supported to be rotatable in a transversely middle position adjacent the rear surfaces of the right and left vertical frames 118. A ball screw nut 130 is vertically movably mounted on the ball screw 129 through transmission balls (not shown). The ball screw nut 130 is fixed to the transverse frame 125 of the connecting frame 124. When the operator holds a grip 131a of the lift wheel 131 fixed to the upper end of the ball screw 129 and turns the lift wheel 131, the connecting frame 124 slides up and down.

A locking device (not shown) is provided between the ball screw 129 and slide frame 116. When the locking device is canceled, the lift wheel 131 is permitted to move the connecting frame 124 vertically. When the locking device is operative, the connecting frame 124 is maintained in a vertical position set by the lift wheel 131 (i.e. corresponding to the height of the front of the lawn mower 10).

As shown in FIGS. 13 and 14, cover frames 132 are fixed to the upper surfaces in right and left end regions of the lower plates 103 except the lower plate 103 located at the foremost end. Each cover frame 132 includes a plurality of long vertical frames 133, a fore and aft frame 134 elongated in the fore and aft direction and fixed to the upper ends of the vertical frames 133, and a plate 135 fixed to the upper surface of the fore and aft frame 134. The vertical frames 133 of the cover frame 132 have guide rails 136A-E fixed thereto as arranged at equal intervals. The guide rails 136A-E have a channel-shaped section opening upward, and have rail widths gradually increasing from top to bottom.

Covers 137A-G are bent to have a channel-shaped section opening downward, with transverse cover widths gradually decreasing from top to bottom. Each of the covers 137B-F has bearings 138 supported outside forward ends of the right and left sides thereof to be rotatable about an axis extending in the right and left direction. The right and left bearings 138 attached to the covers 137B-F are placed in the right and left guide rails 136A-E, respectively, so that the covers 137B-F are slidable forward and backward along the guide rails 136A-E.

Pins 139 extend outward from forward end regions of the right and left sides of the covers 137B-G, and engage with slots 140 elongated in the fore and aft direction and formed in right and left side plates of the covers 137A-F. The cover 137A has a forward end portion thereof bent upward. The forward end portion of this cover 137A is fastened tight and fixed to the rear end of the slide table 109. The cover 137G has right and left lower ends bent outward and fixed to the upper surface of the lower plate 103 located at the rearmost end.

With the covers 137A-G constructed as described above, when the fore and aft feed motor 110 is rotated to move the slide table 109 forward, the cover 137A moves with the slide table 109. When the cover 137A moves forward by an amount corresponding to the length of the slot 140 formed in the cover 137A, the cover 137B begins to move forward. When the cover 137B moves by an amount corresponding to the length of the slot 140 formed in the cover 137B, the cover 137C begins to move forward. Subsequently, the covers 137D-F successively move forward. Thus, the covers 137A-F can cover the moving mechanism 4 from above to prevent entry of trash and the like to the second pit P2. As a result, the slide rails 107 do not easily fail to function properly, and the moving mechanism 4 is invulnerable to damage. The riding type lawn mower 10 can be accurately moved forward and backward.

Upper covers 141 are attached to the plates 135 fixed to the upper surfaces the fore and aft frame 134 arranged at the right and left sides for covering upper peripheral regions of the second pit P2. The upper covers 141 serve to prevent entry to the second pit P2 of trash and the like from the peripheral regions.

When connecting the riding type lawn mower 10 to the moving mechanism 4, the upper ends of the positioning members 127 of the connecting frame 124 of the moving mechanism 4 are lowered below the lower surface of the front frame 18, running boards (not shown) or the like are placed to straddle the first pit P1 in the fore and aft direction, and the riding type lawn mower 10 with the front wheels 11 attached thereto is moved forward from a rightward position. Then the lift wheel 131 of the moving mechanism 4 is operated to raise the connecting frame 124, the front wheels 11 are raised slightly from the floor FL, the connecting bolts are loosened to remove the front wheels 11 from the front wheel brackets 19, and the lift wheel 131 is operated to adjust the height of the front of the lawn mower 10 to place the upper surface of the mower deck 15 parallel to the floor FL. Consequently, the lawn mower 10 is connected to the moving mechanism 4 in the state shown in FIG. 1.

As shown in FIGS. 11 and 12, a detection bracket 142 extends downward from the lower surface of a forward part of the slide table 109. Proximity sensors 143 are mounted on the upper surfaces of the lower plate 103 located at the foremost end and the lower plate 103 second from the rearmost end. This arrangement can detect a forward end position and a rear end position for moving the riding type lawn mower 10 connected to the connecting frame 124.

The moving mechanism 4 is constructed as described above, for the fore and aft feed motor 110 to move the riding type lawn mower 10 forward and backward. Compared, for example, with a case of moving the riding type lawn mower 10 in a self-propelled mode to measure air speed or air pressure, the lawn mower 10 can be moved forward and backward accurately along the slide rails 107, and can be position accurately relative to the measuring apparatus 2. As a result, the speed or pressure of air blown by the mower unit M may be measured in an accurate position.

Further, compared with the case of moving the riding type lawn mower 10 in the self-propelled mode, this construction does not require the lawn mower 10 to be moved whenever the measurer changes a position for measuring air speed or air pressure. This improves the working efficiency of measuring of air speed or air pressure.

[Control Device of Measuring System]

Figure 15:
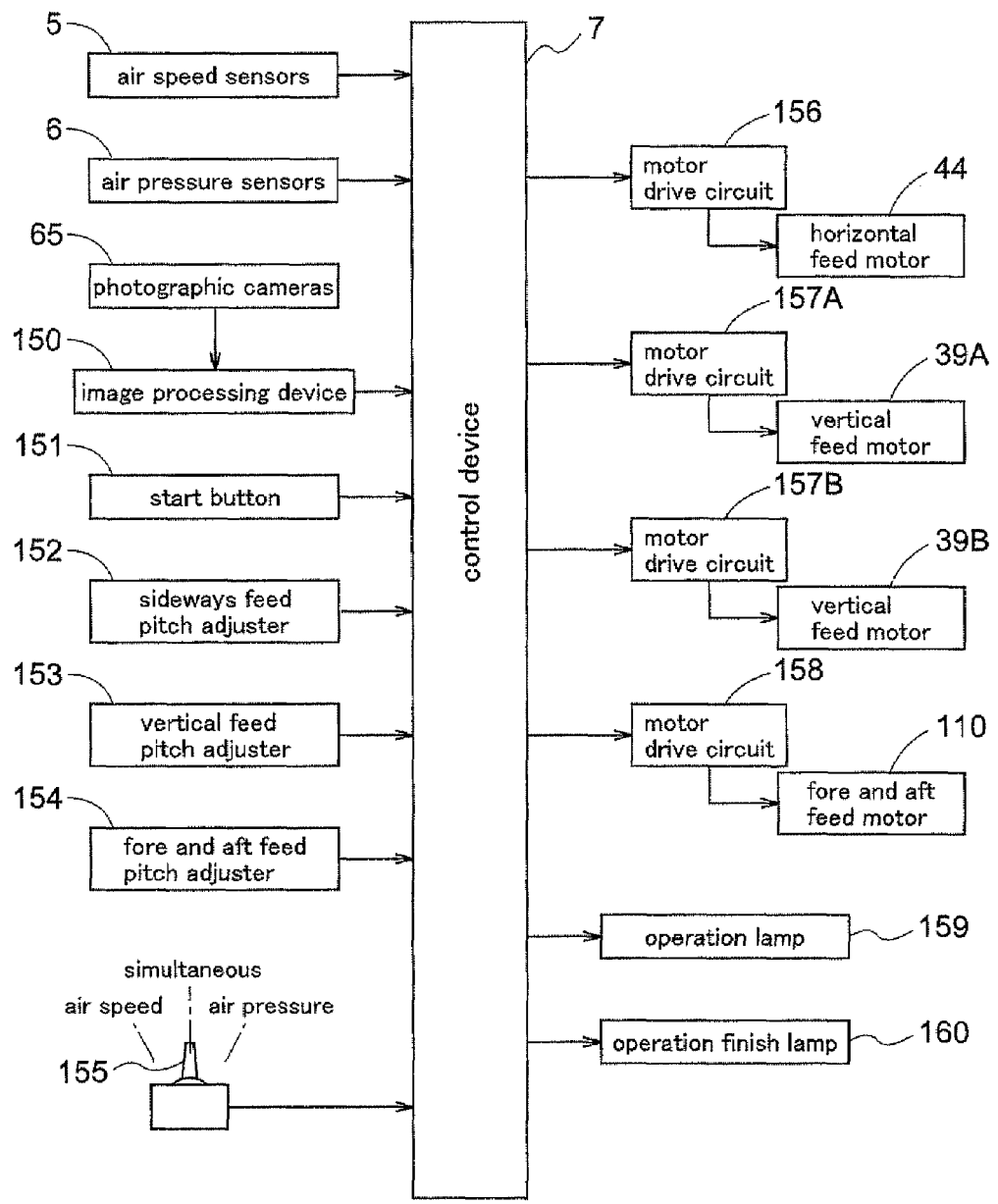
FIG. 15 is a block diagram of a control device of the measuring system.

The control device 7 of the measuring system 1 will be described with reference to FIG. 15. FIG. 15 is a block diagram of the control device 7 of the measuring system 1. As shown in FIG. 15, the air speed sensors 5 and air pressure sensors 6 of the measuring apparatus 2 are connected to the control device 7. The photographic cameras 65 of the measuring apparatus 2 are connected to the control device 7 through the image processing device 150.

The control panel 8 includes an operating surface having a start button 151 connected to the control device 7 mounted inside the control panel 8. The operator, by pushing this start button 151, can start an automatic operation to be described hereinafter.

Figure 17:
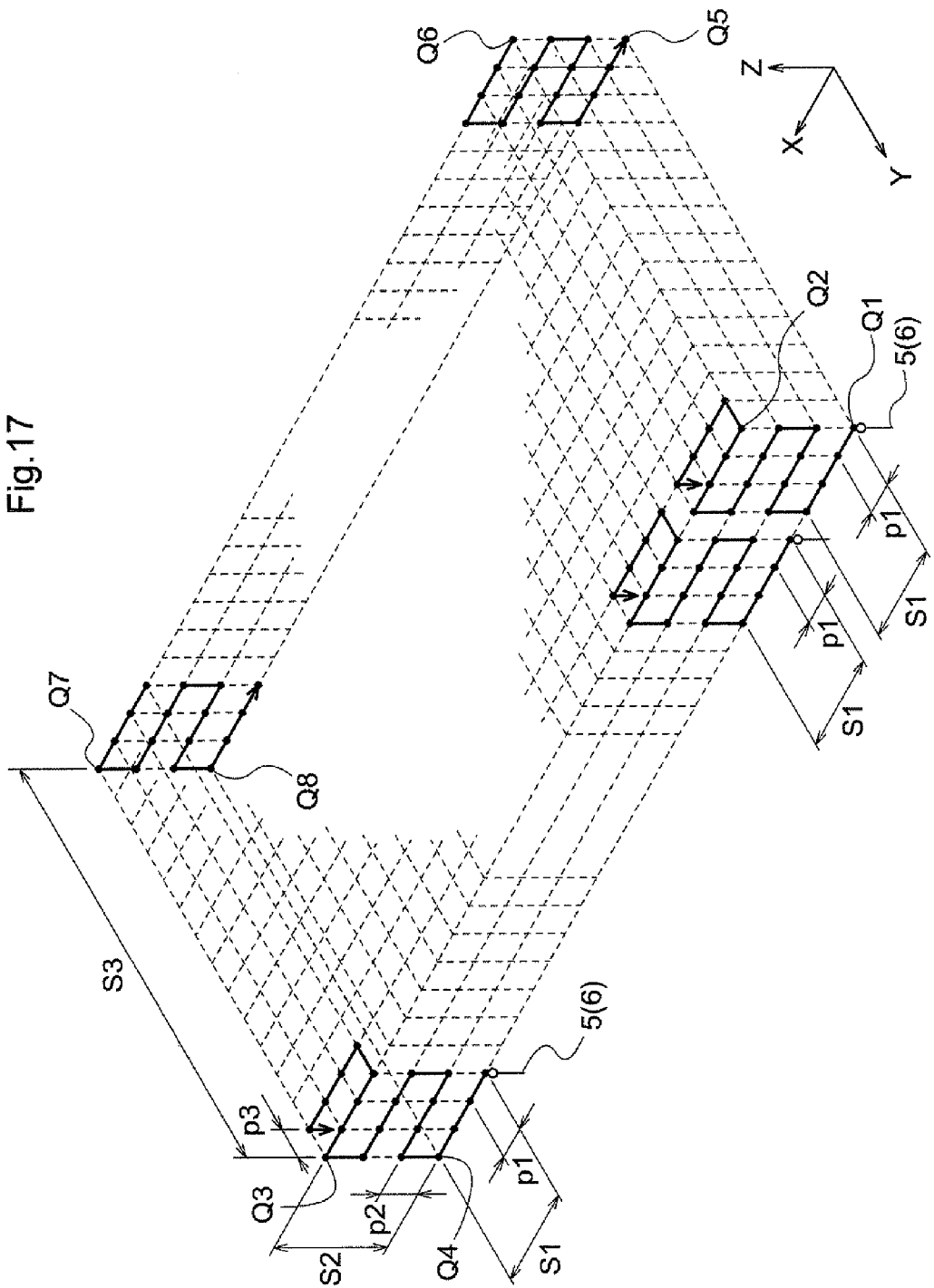
FIG. 17 is a schematic perspective view illustrating a measuring position for measuring air speed or air pressure.

The operating surface of the control panel 8 includes a sideways feed pitch adjuster 152 for varying and adjusting a measuring width in the right and left direction (sideways feed pitches p1) for measuring air speed or air pressure with the air speed sensors 5 or air pressure sensors 6, a vertical feed pitch adjuster 153 for varying and adjusting a measuring height in the vertical direction (vertical feed pitches p2) for measuring air speed or air pressure with the air speed sensors 5 or air pressure sensors 6, and a fore and aft feed pitch adjuster 154 for varying and adjusting a measuring length in the fore and aft direction (fore and aft feed pitches p3) for measuring air speed or air pressure with the air speed sensors 5 or air pressure sensors 6, which adjusters are connected to the control device 7 mounted inside the control panel 8 (see FIG. 17).

With the sideways feed pitch adjuster 152, vertical feed pitch adjuster 153 and fore and aft feed pitch adjuster 154 arranged as described above, the sideways feed pitches p1, vertical feed pitches p2 and fore and aft feed pitches p3 can be varied and adjusted. This arrangement allows the air speed or air pressure measuring pitches in the right and left direction, vertical direction and fore and aft direction may be varied as desired, for example, according to the specifications (e.g. the size of mower deck 15, the type of blades 16, etc.) of the lawn mower whose air speed or air pressure is to be measured, or different reaping heights for which air speed or air pressure is to be measured.

The operating surface of the control panel 8 further includes a mode changeover switch 155 connected to the control device 7 mounted inside the control panel 8. The mode changeover switch 155 has three positions for air speed, simultaneous (air speed and air pressure), and air pressure. Thus, the mode changeover switch 155 is operable to select an air speed measuring mode for measuring only air speed, a simultaneous measuring mode for measuring air speed and air pressure, or an air pressure measuring mode for measuring only air pressure.

The horizontal feed motor 44 of the measuring apparatus 2, the vertical feed motor 39A for the air speed sensors 5, the vertical feed motor 39B for the air pressure sensors 6, and the fore and aft feed motor 110 of the moving mechanism 4 are servomotors connected to the control device 7 through a motor drive circuit 156, motor drive circuits 157A and B, and a motor drive circuit 158, respectively. Each motor may be driven and stopped with increased accuracy in a measuring position for measuring air speed or air pressure. Its number of rotations may be changed to change a moving speed to the measuring position.

The operating surface of the control panel 8 includes also an operation lamp 159 and an operation finish lamp 160 connected to the control device 7. The operation lamp 159 is lit when an automatic operation is started by automatic operation control described hereinafter. When the automatic operation is finished, the operation lamp 159 goes out and the operation finish lamp 160 blinks.

[Automatic Operation Control]

Figure 16:
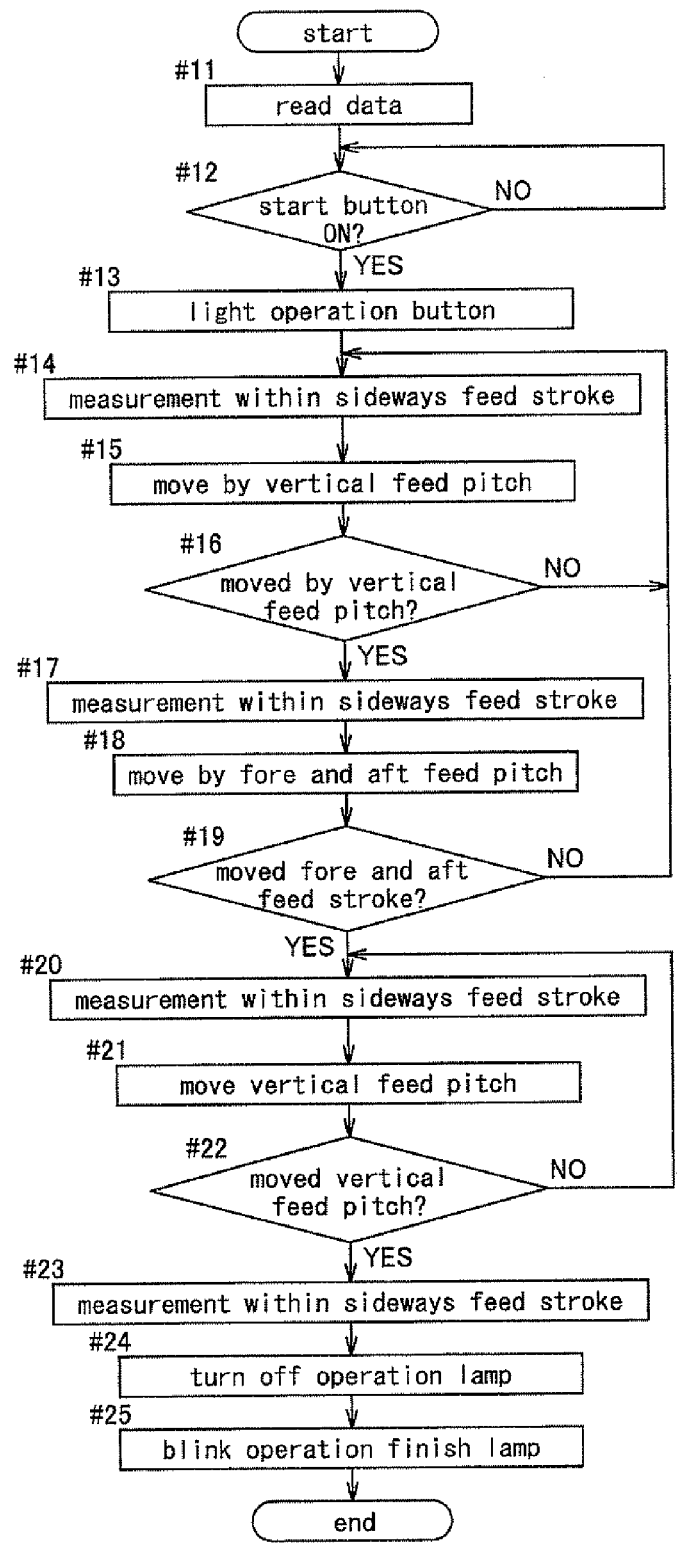
FIG. 16 is a flow chart of automatic operation control.

The automatic operation control carried out with this measuring system 1 will be described with reference to FIGS. 16 and 17. FIG. 16 is a flow chart of the automatic operation control. FIG. 17 is a schematic perspective view illustrating a measuring position for measuring air speed or air pressure (i.e. schematic view depicting in a simplified way areas and positions for measuring air speed or air pressure) with the measuring system 1.

FIG. 17 shows a schematic perspective view of a space for measuring air speed or air pressure as seen from a position upper left forward from the mower unit M of the riding type lawn mower 10. In the following description, it is assumed, by way of example, that the mode changeover switch 155 is set to the air speed or air pressure position. When the mode changeover switch 155 is set to simultaneous, the situation is similar to measurement of air speed or air pressure except that measuring positions increase and the measuring area enlarges.

Referring to FIG. 16, data inputted to the control device 7 is read (step #11), and when the start button 151 on the control panel 8 is pushed (step #12: YES), the operation lamp 159 is lit (step #13).

Next, the control device 7 outputs a command to the motor drive circuit 156. The air speed sensors 5 or air pressure sensors 6 measure an air speed or air pressure in each measuring position where the horizontal feed motor 44 stops at each predetermined sideways feed pitch p1 while repeating drive and stop within a sideways feed stroke S1 (step #14).

When the measurement of the air speed or air pressure in each measuring position within the sideways feed stroke S1 is completed, the control device 7 outputs a command to the motor drive circuit 157, whereby the vertical feed motor 39 rotates and stops. The air speed sensors 5 or air pressure sensors 6 move by a predetermined vertical feed pitch p2 (step #15).

When the air speed sensors 5 or air pressure sensors 6 have moved the predetermined vertical feed pitch p2, the control device 7 outputs a command to the motor drive circuit 156 again. The air speed sensors 5 or air pressure sensors 6 measure an air speed or air pressure in each measuring position where the horizontal feed motor 44 stops at each predetermined sideways feed pitch p1 while repeating drive and stop within the sideways feed stroke S1 (step #16: No and step #14). When the measurement of the air speed or air pressure in each measuring position within the sideways feed stroke S1 is completed, the control device 7 outputs a command to the motor drive circuit 157, whereby the vertical feed motor 39 rotates and stops. The air speed sensors 5 or air pressure sensors 6 move by the predetermined vertical feed pitch p2 (step #15).

The outputs from the control device 7 to the motor drive circuits 156 and 157 cause the horizontal feed motor 44 and vertical feed motor 39 to repeat rotation and stopping for repeating measurement of air speed or air pressure (step #16: NO, step #14 and step #15). When the air speed sensors 5 or air pressure sensors 6 have moved the vertical feed stroke S2 (step #16: YES), the horizontal feed motor 44 is rotated and stopped at the height corresponding to the vertical feed stroke S2 moved, for measuring an air speed or air pressure within the horizontal feed stroke S1 (step #17). In this way, measurement of air speed or air pressure is completed in all the measuring positions in the plane of X-Z directions defined by Q1-Q4 shown in FIG. 17.

Upon completion of the measurement of air speed or air pressure in all the measuring positions in the plane of X-Z directions shown in FIG. 17, the control device 7 outputs a command to the motor drive circuit 158, whereby the air speed sensors 5 or air pressure sensors 6 move a predetermined fore and aft feed pitch p3 (step #18).

The outputs from the control device 7 to the motor drive circuits 156, 157 and 158 cause the horizontal feed motor 44, vertical feed motor 39 and fore and aft feed motor 110 to repeat rotation and stopping for repeating measurement of air speed or air pressure (step #19: NO, steps #14 to #18). The air speed sensors 5 or air pressure sensors 6 successively measure air speeds or air pressures in the measuring positions in the planes of the X-Z directions shifted the fore and aft pitches p3 shown in FIG. 17.

When the air speed sensors 5 or air pressure sensors 6 have moved by a fore and aft feed stroke S3 (step #19: YES), the horizontal feed motor 44 and vertical feed motor 39 are rotated and stopped in the position having moved by the fore and aft feed stroke S3. Air speeds or air pressures are measured in the measuring positions in the plane of X-Z directions defined by Q5-Q8 shown in FIG. 17, in the same measuring method as in steps #14 through #17 (steps #20 through #23).

Although not shown, when air speed is measured by the air speed sensors 5, the air pressure sensors 6 are set to their lower limit position. This prevents a situation where the air pressure sensors 6 project upward, when measuring air speed, to change flows of air blown by the mower unit M. This allows for accurate measurement of air speed.

When air pressure is measured by the air pressure sensors 6, the air speed sensors 5 are set to their lower limit position. This prevents a situation where the air speed sensors 5 project upward, when measuring air pressure, to change flows of air blown by the mower unit M. This allows for accurate measurement of air pressure.

Upon completion of the measurement of air speed or air pressure in the measuring positions in the plane of X-Z directions defined by Q5-Q8 shown in FIG. 17, completing measurement of air speed or air pressure in all the measuring positions in the so measurement area defined by Q1-Q8 shown in FIG. 17, (step #22: YES, and step #23), the output from the control device 7 to the operation lamp 159 is cut off to turn of the operation lamp 159 (step #24). The control device 7 gives an output to the operation finish lamp 160, whereby the operation finish lamp 160 blinks for a predetermined time to notify the measurer visually that the measurement of air speed or air pressure by automatic operation has been completed (step #25).

As shown in FIG. 17, under the automatic operation control, the horizontal feed motor 44 and vertical feed motor 39 are rotated to move the air speed sensors 5 and air pressure sensors 6 vertically and right and left along the moving paths shown in thick lines in FIG. 17. With this movement, measurement is performed of air speed or air pressure in the plane of X-Z directions defined by Q1-Q4 shown in FIG. 17. The riding type lawn mower 10 is moved forward by rotating the fore and aft feed motor 110, for automatically measuring air speed or air pressure in the measurement area defined by Q1-Q8 shown in FIG. 17. As a result, the air speeds or air pressures in the measurement area can be measured in a fully automatic way only by attaching the riding type lawn mower 10 to the measuring system 1 and by operating the start button 151. This improves the working efficiency of measuring air speed or air pressure.

In the automatic operation control, the horizontal feed motor 44, vertical feed motor 39 and fore and aft feed motor 110 are rotated and stopped to move the air speed sensors 5 or air pressure sensors 6 to describe rectangles. Thus, the air speed or air pressure in the measurement area defined by Q1-Q8 shown in FIG. 17 can be measured quickly with the short moving path to shorten measuring time. This further improves the working efficiency of measuring air speed or air pressure.

[Method of Detecting Relative Position of Mower Unit]

Figure 18:
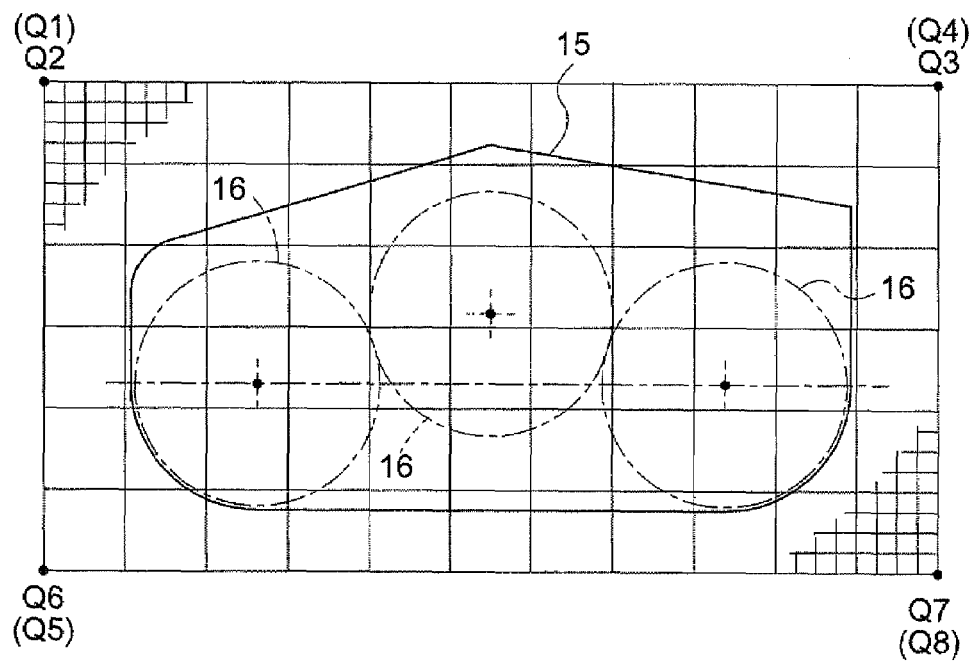
FIG. 18 is a schematic plan view illustrating a method of detecting a relative positional relationship.
Figure 19:
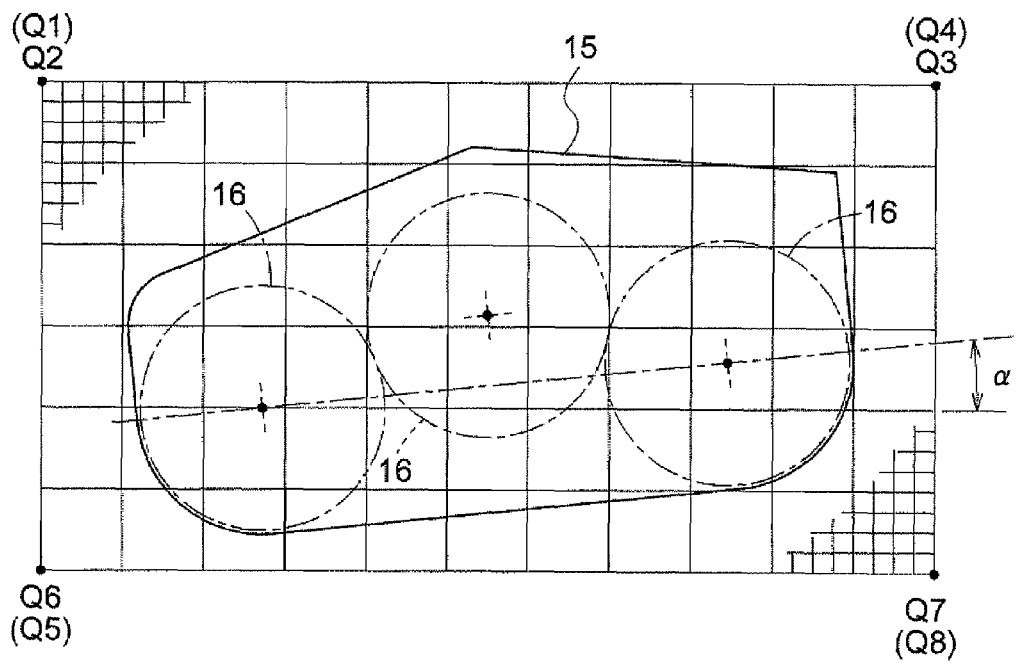
FIG. 19 is a schematic plan view illustrating the method of detecting the relative positional relationship.

A method of detecting a position of the mower unit M of the riding type lawn mower 10 relative to the measuring apparatus 2 of the measuring system 1 will be described with reference to FIGS. 18 and 19. FIGS. 18 and 19 are schematic plan views illustrating the method of detecting a relative positional relationship.

As shown in FIG. 3, the photographic cameras 65 are arranged to be located directly under the centers of rotation of the right and left blades 16 of the mower unit M. Thus, the photographic cameras 65 can take photographs of the mower unit M (adjacent the centers of rotation the right and left blades 16 of the mower unit M) relative to the measuring apparatus 2.

The photographic cameras 65 photograph positions of the centers of rotation of the blades 16 of the mower unit M from below while the riding type lawn mower 10 is moved forward relative to the measuring apparatus 2 by the fore and aft feed motor 110 under the automatic operation control described above. The images acquired by the photographic cameras 65 are analyzed by the image processing device 150. After completion of the automatic operation control, the control device 7 can recognize a position relative to the measuring apparatus 2 of the mower unit M whose air speed or air pressure has been measured.

For example, without the right and left blades 16 of the mower unit M shifting from each other in the fore and aft direction, a straight line connecting the centers of rotation of the right and left blades 16 of the mower unit M is parallel to straight lines connecting, in the right and left direction, the measuring positions where air speed or air pressure is measured. When air speed or air pressure is measured in this state, the positional relationship in plan view of the mower unit M with the measuring area (Q1-Q8) and measuring positions for measuring air speed or air pressure under the automatic operation control is recognized as shown in FIG. 18.

For example, with the right and left blades 16 of the mower unit M shifting from each other in the fore and aft direction, a straight line connecting the centers of rotation of the right and left blades 16 of the mower unit M is inclined by an angle α to the straight lines connecting, in the right and left direction, the measuring positions where air speed or air pressure is measured. When air speed or air pressure is measured in this state, the positional relationship in plan view of the mower unit M with the measuring area (Q1-Q8) and measuring positions for measuring air speed or air pressure under the automatic operation control is recognized as shown in FIG. 19.

In this way, the position relative to the measuring apparatus 2 of the mower unit M whose air speed or air pressure is measured can be recognized with the photographic cameras 65. It is thus possible to recognize correctly in which position in plan view of the mower unit M data is derived from the measuring positions for measuring the air speed or air pressure. This allows for an accurate analysis of the speed or pressure of air blown by the mower unit M.

Based on the pictures derived from the photographic cameras 65, the position relative to the measuring apparatus 2 of the mower unit M whose air speed or air pressure is measured can be recognized in a way to recognize an outline of the mower deck 15 of the mower M. Instead of using the photographic cameras 65, for example, a detecting device may be provided for the measuring apparatus 2, for detecting positions of the blades 16 or positions of the outline of the mower deck 15 with sensors (not shown), thereby recognizing the position relative to the measuring apparatus 2 of the mower unit M whose air speed or air pressure is measured.

The data derived from the measuring system 1 as described above may be analyzed, for example, through comparison with data of swaths remaining after lawn or grass is actually cut by the riding type lawn mower 10 in the same state in which data is derived from the measuring system 1. It is thereby possible to obtain a relationship between the speed or pressure of air blown by the mower unit M and the swaths. Based on results of the analysis, shapes or the like of the mower deck 15 and blades 16 may be improved to promote the cutting performance of the riding type lawn mower 10.

Other Embodiments

The foregoing embodiment employs the air speed sensors 5 as air speed measuring device, and the air pressure sensors 6 as air pressure measuring device. The air speed measuring device may have a different shape and construction, and the air pressure measuring device may also have a different shape and construction.

In the foregoing embodiment, the air speed sensors 5 and air pressure sensors 6 of the measuring apparatus 2 are movable sideways and vertically by the horizontal feed motor 44 and vertical feed motor 39. The measuring apparatus 2 may be constructed to have the air speed sensors 5 and air pressure sensors 6 fixed, instead of being movable, for measuring air speed or air pressure.

In the foregoing embodiment, the measuring device moving mechanism is constructed to have the air speed sensors 5 or air pressure sensors 6 movable in the right and left direction along the floor FL by operating the horizontal feed motor 44 to move the slide frame 31 right and left. The measuring device moving mechanism may be constructed to move the air speed sensors 5 or air pressure sensors 6 in a different direction. For example, the measuring device moving mechanism may be constructed to move the air speed sensors 5 or air pressure sensors 6 fore and aft or obliquely along the floor FL.

In the foregoing embodiment, the air speed sensors 5 or air pressure sensors 6 are movable sideways or vertically by the horizontal feed motor 44 or vertical feed motor 39. A different mechanism may be employed for moving the air speed sensors 5 and air pressure sensors 6. The measuring apparatus 2 may be constructed to move the air speed sensors 5 and air pressure sensors 6 with different actuators such as hydraulic or electric cylinders (not shown), for example.

In the foregoing embodiment, the pit P is formed in the concrete floor FL, and the measuring apparatus 2 is installed in the first pit P1. The floor FL may be formed of a different material. This invention is equally applicable to the case of forming a recess (pit P) in a floor FL formed of soil, asphalt, wood, steel plate, etc.

The foregoing embodiment shows an example where the measuring system 1 measures the speed or pressure of air blown by the mower unit M of the riding type lawn mower 10 which is one example of lawn mowers. The measuring system 1 may measure air speed or pressure from lawn mowers of different types and sizes. It is possible to measure the air speed or air pressure, for example, of a riding type lawn mower of twin-blade structure having two blades 16, and a walking-operator type lawn mower (not shown).

What is claimed is:

1. A measuring apparatus for a mower comprising:
a floor defining a downward recess with respect to a floor surface; and
an air speed measuring device disposed in said recess for measuring a speed of air blown by the mower, said air speed measuring device having one or more air speed detecting elements, and said air speed detecting elements being height adjustable to measure air speed at a plurality of heights including above, below, and substantially level with the floor surface.

2. A measuring apparatus as defined in claim 1, further comprising a measuring device moving mechanism for moving said air speed measuring device along a direction in which said floor surface extends.

3. A measuring apparatus as defined in claim 1, further comprising a vertical moving mechanism for vertically moving said air speed measuring device.

4. A measuring apparatus as defined in claim 1, wherein the floor surface is operable as a reference height for said air speed measuring device.

5. A measuring apparatus for a mower comprising:
a floor defining a downward recess with respect to a floor surface; and
an air pressure measuring device disposed in said recess for measuring a pressure of air blown by the mower, said air pressure measuring device having one or more air pressure detecting elements, and said air pressure detecting elements being height adjustable to measure air pressure at a plurality of heights including above, below, and substantially level with the floor surface.

6. A measuring apparatus as defined in claim 5, further comprising a measuring device moving mechanism for moving said air pressure measuring device along a direction in which said floor surface extends.

7. A measuring apparatus as defined in claim 5, further comprising a vertical moving mechanism for vertically moving said air pressure measuring device.

8. A measuring apparatus as defined in claim 5, wherein the floor surface is operable as a reference height for said air pressure measuring device.

9. A measuring apparatus for a mower comprising:

an air speed measuring device disposed in a recess formed in a floor surface for measuring a speed of air blown by the mower, said air speed measuring device having one or more air speed detecting elements; and an air pressure measuring device disposed in the recess formed in the floor surface for measuring a pressure of air blown by the mower, said air pressure measuring device having one or more air pressure detecting elements;

wherein said air speed detecting elements and said air pressure detecting elements are height adjustable and measure air speed and air pressure, respectively, at a plurality of heights including above, below, and substantially level with the floor surface;

wherein said air speed measuring device and said air pressure measuring device are supported together by a frame structure.

10. A measuring apparatus as defined in claim 9, further comprising a measuring device moving mechanism for moving said frame structure along a direction in which said floor surface extends.

11. A measuring apparatus as defined in claim 9, further comprising a vertical moving mechanism for vertically moving said frame structure.

12. A measuring apparatus as defined in claim 9, wherein the floor surface is operable as a reference height for the air speed measuring device and for said air pressure measuring device.

* * * * *